United States Patent [19]

Takahashi et al.

[11] Patent Number: 5,444,525
[45] Date of Patent: Aug. 22, 1995

[54] IMAGE FORMING APPARATUS WITH IMAGE RECORDING TIMING CONTROL

[75] Inventors: Masaki Takahashi; Teruo Kurihara, both of Yokohama; Nakaba Komiyama, Chigasaki; Manabu Mikami, Kawasaki, all of Japan

[73] Assignee: Kabushiki Kaisha Toshiba, Kawasaki, Japan

[21] Appl. No.: 212,883

[22] Filed: Mar. 15, 1994

[30] Foreign Application Priority Data

Mar. 15, 1993 [JP] Japan ................................ 5-054123
Nov. 16, 1993 [JP] Japan ................................ 5-286866

[51] Int. Cl.$^6$ .............................................. G03G 15/01
[52] U.S. Cl. ................................ 355/327; 347/115; 347/116; 355/208
[58] Field of Search ........ 355/200, 203, 208, 210–212, 355/326 R, 327; 346/157, 160; 198/502.3; 347/115, 116

[56] References Cited

U.S. PATENT DOCUMENTS

| 4,531,828 | 7/1985 | Hoshino | 346/160 |
| 4,660,077 | 4/1987 | Kawamura et al. | 358/75 |
| 4,723,145 | 2/1988 | Takada et al. | 355/326 X |
| 4,731,638 | 3/1988 | Cherian | 355/200 |
| 5,164,783 | 11/1992 | Taguchi et al. | 355/327 |
| 5,235,392 | 8/1993 | Hediger | 355/208 X |
| 5,243,396 | 9/1993 | Castelli et al. | 355/327 |
| 5,255,063 | 10/1993 | Ideyama et al. | 355/327 |
| 5,325,155 | 6/1994 | Perry | 355/208 |

FOREIGN PATENT DOCUMENTS

| 59-163971 | 9/1984 | Japan . |
| 62-178982 | 8/1987 | Japan . |
| 62-242969 | 10/1987 | Japan . |
| 1-277258 | 11/1989 | Japan . |

OTHER PUBLICATIONS

Electro-photography Proceeding, Japan Hard Copy '91; A-27P; Hirakura et al.; Jul. 1991; pp. 101-104.

Primary Examiner—William J. Royer
Attorney, Agent, or Firm—Foley & Lardner

[57] ABSTRACT

The image forming apparatus can retain a stable and high image quality for many hours without use of any high precise mechanical parts and without causing any non-uniformity and mal-registration in a color image. In the image forming apparatus, an image recording medium (photosensitive drum) (6a) is driven by a rotative driving mechanism (pulleys and belts) (40a); and an image recording section (print bar) (6c) records an image repeatedly on the rotating image recording medium (6a) in a direction perpendicular to a rotational direction of the image recording medium. The image recorded on the image recording medium (6a) is transcribed onto an image transcribing medium (paper) (22) being fed in the rotational direction of the image recording medium (6a) to form an image. In particular, the apparatus comprises a rotation detecting section (rotary encoder) (6r) for detecting angular travel rates of the image recording medium (6a); and a recording timing control section (5) for controlling recording timing (HSYNC) at which the image is started to be recorded in the direction perpendicular to the rotational direction of the image recording medium (6a), on the basis of the angular travel rates detected by the rotation detecting section (6r).

20 Claims, 25 Drawing Sheets

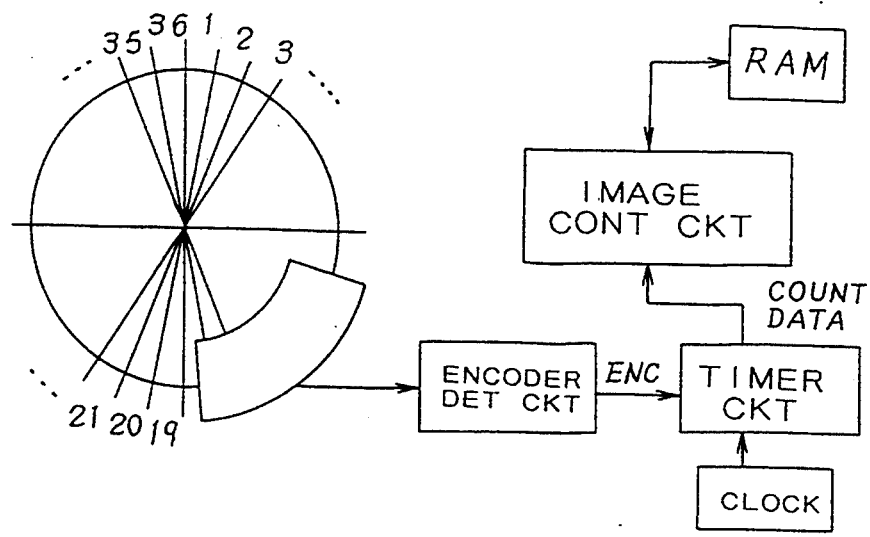
F I G. 8
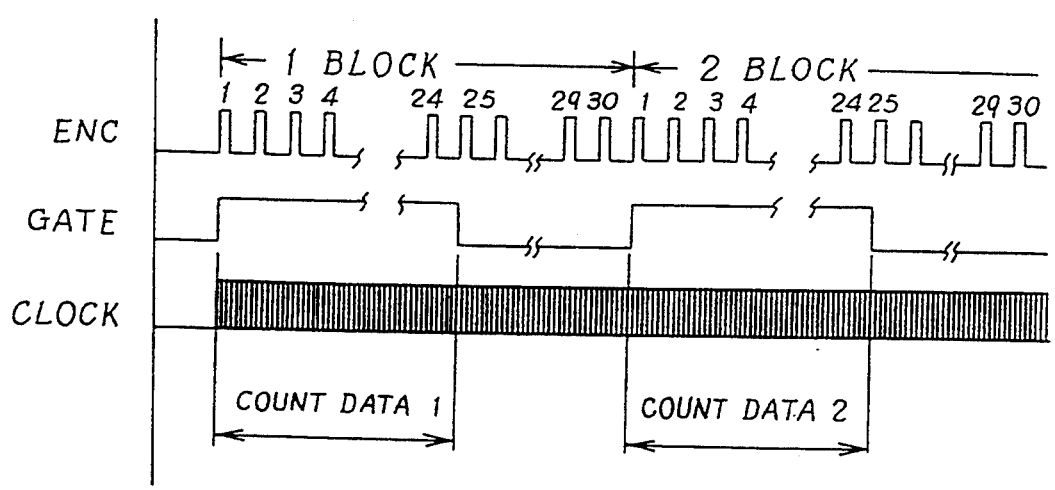
F I G. 9

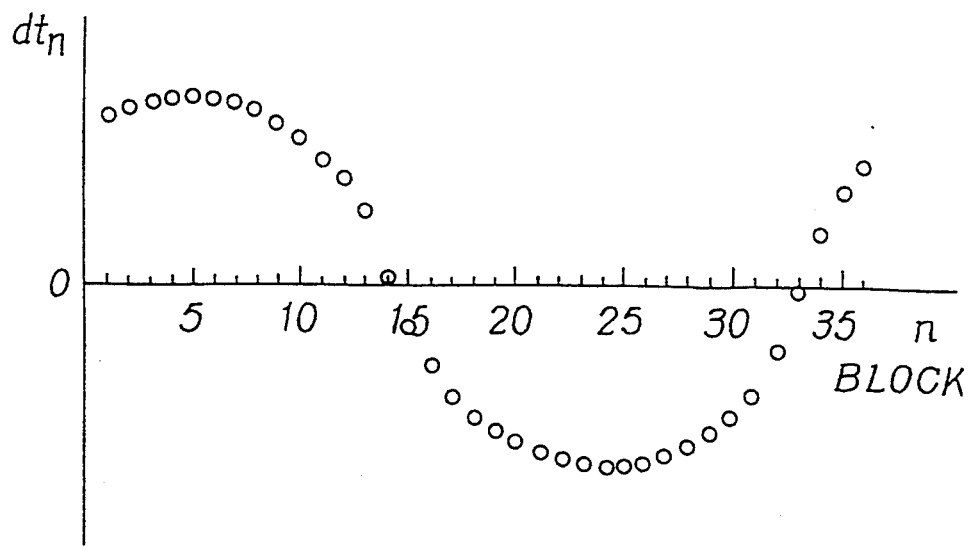
FIG. 10
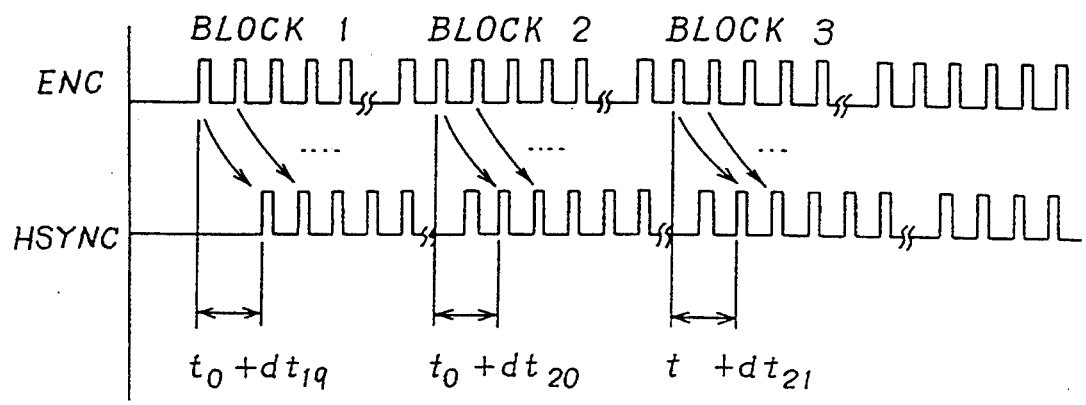
$t_0 + dt_{19}$   $t_0 + dt_{20}$   $t + dt_{21}$
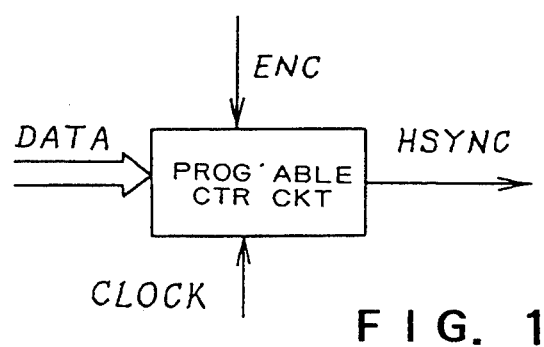
FIG. 11

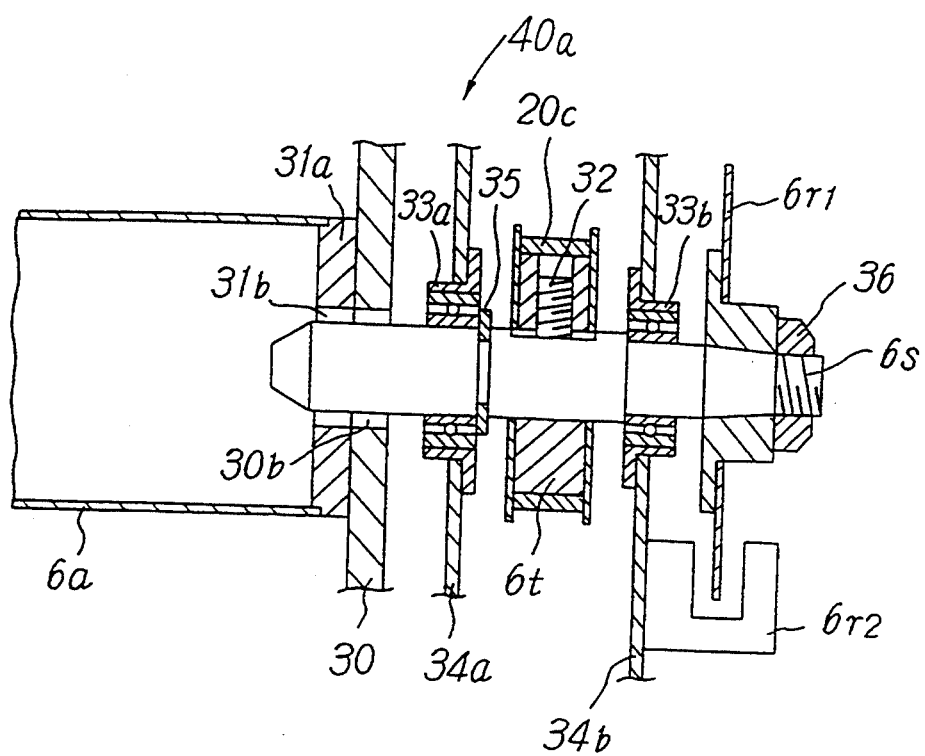
F I G. 12

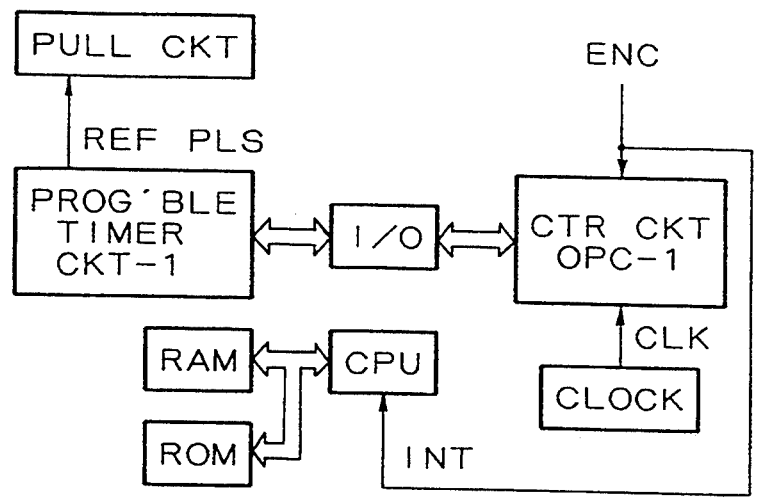
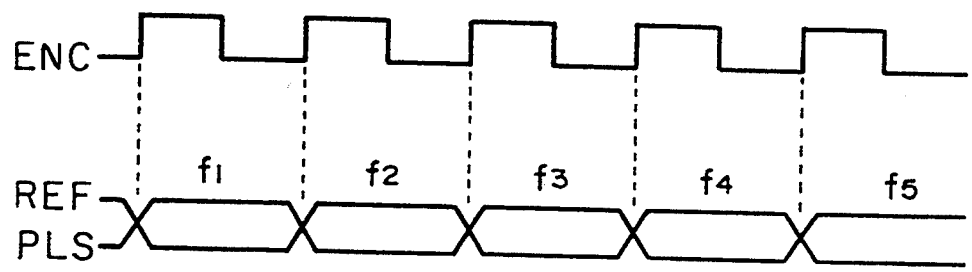
FIG. 30

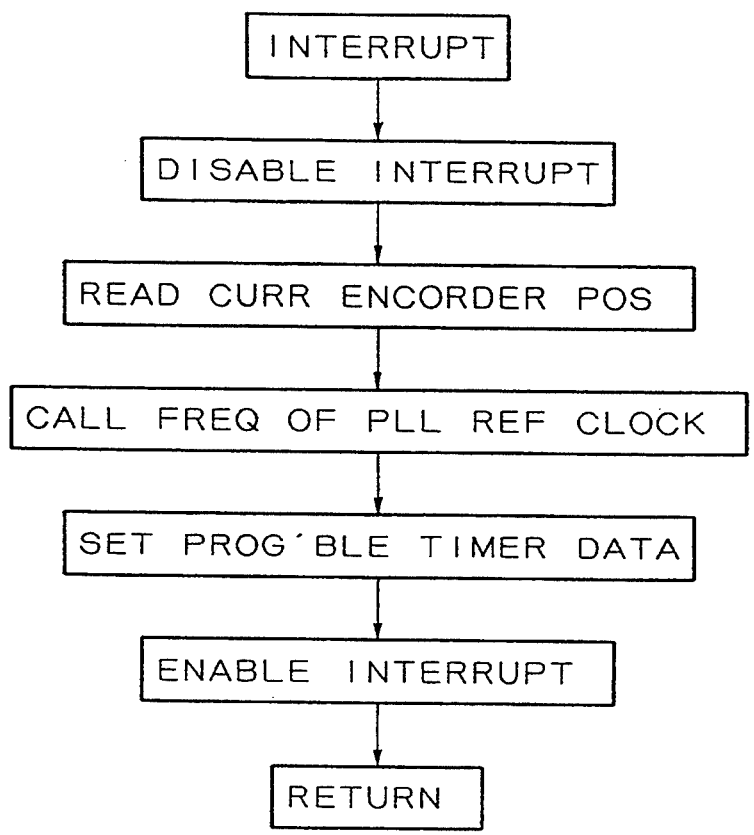
F I G. 31

IMAGE FORMING APPARATUS WITH IMAGE RECORDING TIMING CONTROL

BACKGROUND OF THE INVENTION

1. Field of the Invention

The present invention relates to an image forming apparatus, and more specifically to such an image forming apparatus that an image is recorded on a rotating image recording medium and further the recorded image is transcribed onto an image transcribing medium fed in the same direction as the rotative direction of the image recording medium.

2. Description of the Prior Art

Conventionally, various image forming methods are adopted for printing apparatuses (e.g., printer) for forming an image on an image forming medium (e.g., paper). For instance, the typical methods are: (1) electrophotographic method such that an image is formed electrostatically on a photosensitive drum, the formed image is changed so as to be visible by use of toner, and then the toner image is transcribed onto a paper as an image; (2) an ink jet method such that ink is directly jetted onto a paper to form an image; (3) a silver halide photographic method such that an image is exposed and recorded on a photosensitive color forming substance; etc.

In the case where a color image is formed by use of a printing apparatus based upon the electrophotographic method, this electrophotographic method is further classified into some methods as follows: (1) A monochromatic (of the three primary colors of yellow, magenta and cyan and in addition black in some cases) toner image is formed on a photosensitive drum and the formed toner image is transcribed onto a paper. The above-mentioned process is repeated three times for three colors. (2) Three-color toner images are formed on a photosensitive drum, and the formed toner images are transcribed onto a paper simultaneously. (3) Four image forming units (for three primary colors and black) each for forming a monochromatic toner image are arranged in the paper feed direction in sequence, and a color image is formed by superposing (overlapping) the four monpchromatic images. In these methods, the method for arranging a plurality of image forming units in the paper feed direction (referred to as tandem method) is one of the best methods in that the apparatus is high in printing and recording speed and small in size.

FIG. 2 shows an example of the construction of the tandem color image forming apparatus of electrophotographic type in which four monochromatic (yellow, magenta, cyan and black) image forming units 6, 7, 8 and 9 are arranged in the paper feed direction (in the arrow direction). The respective image forming unit is composed of a photosensitive drum 6a, 7a, 8a or 9a (image recording medium), a print bar 6c, 7c, 8c or 9c (image recording means) for forming a latent image on the surface of the drum, a developing unit 6d, 7d, 8d or 9d for developing the latent image to a toner image, a transcribing roller 6e, 7e, 8e or 9e for transcribing the toner image on the drum onto a paper (transcribing medium), a charge removing lamp 6g, 7g, 8g or 9g for removing charge on the surface of the drum after transcription, a memory removing brush 6h, 7h, 8h or 9h for averaging the residual toner after transcription, and a charging unit 6b, 7b, 8b or 9b for charging the drum surface uniformly.

In the example shown in FIG. 2, although a cleanerless process for returning the residual toner on the drum (after transcription) to the developing unit is shown, there exists another apparatus such that a cleaning unit is provided for cleaning the residual toner on the drum (after transcription), instead of the memory removing brush provided for the clearless process.

The toner images formed by the respective image forming units are transcribed being superposed with each other in sequence onto the paper fed by the transcription belt 10 under the condition that the paper is adhered to the transcription belt 10 by an electrostatic force generated therebetween. Further, the transcribed toner images are melted on and pressed against the paper by a fixing unit 12 to form a color image.

In the above-mentioned image forming apparatus, since a plurality of image forming units are provided as described above, there exists such an advantage that the time required to form a color image is relatively short, as compared with that required for the other methods. In contrast with this, however, since the four monochromatic images are transcribed onto a paper under overlapped conditions by the respective image forming units, the respective images tend to mismatch from each other (mal-register), with the result that there exists a problem in that the image quality is deteriorated. Here, "mal-register" implies that a mismatching of successive colors transcribed over each other.

The mechanism of occurrence of the mal-register in the color image obtained by the tandem type apparatus will be explained simply with reference to FIG. 3, which shows changes in mismatch of the respective monochromatic images from the respective ideal positions on paper. For brevity, only the mal-register in the paper feed (the sub-scanning) direction is taken into account, without consideration of the mal-register in the main scanning direction perpendicular to the paper feed direction. In the drawing, the mal-register waveform can be classified roughly into long-period fluctuations (whose amplitude is denoted by $\alpha$), a short-period fluctuations (whose amplitude is denoted by $\beta$), and an offset denoted by e in each of the four monochromatic images.

The long-period fluctuations are caused by the speed fluctuations due to eccentricities of the driving and transmitting mechanisms for the photosensitive drum, the transcribing belt, etc.; the short-period fluctuations are caused by the vibrations of the driving and transmitting mechanisms for the photosensitive drum, etc.; and the offset is caused by the mounting errors of the respective image forming units, change in distance between the units due to thermal expansion, the mounting error of the print bar, etc.

Therefore, the long-period fluctuations and the offset result in the mal-register when the monochromatic images are transcribed being superposed with each other, so that the color image is unstable in color reproducibility and resolution.

The allowable mal-register due to superposed images is about 1.5 times of the resolution in general. For instance, in the case of the printing apparatus of 300 dpi in resolution, the allowable mal-register is 0.127 mm. When this allowable value is sheared to the manufacturing precision of the respective elements, the respective elements must be manufactured on the order of several micrometers. For instance, in order to suppress the mal-register in color image due to the expansion and contraction of the formed images caused by the eccentricity of the rotating elements (e.g., gears), the concentricity of the gear (which exerts the most serious influence upon the mal-register) must be determined on the order of several micrometers. Further, it is necessary to mount the image forming units and the print bars at the precision of less than 20 micrometers.

On the other hand, although the short-period fluctuations are caused by the vibrations of the driving and transmitting mechanism for the photosensitive drum, even if the vibration amplitude is small, stripe-shaped color shade non-uniformity (referred to banding) develops in color image. In particular, this banding becomes prominent in the image of medium gradation. Therefore, in the case of the color printing apparatus, since photographs or images including many intermediate gradations are often printed, the image having the bandings is very unsightly, so that the banding must be suppressed as much as possible. In order to eliminate the banding, the rotative speed fluctuations of the photosensitive drum must be reduced below 1 to 3%, so that an extremely high precision is required to manufacture the driving mechanism of the photosensitive drum.

To eliminate the mal-register and the banding to such a low level as to be negligible, a high precision has been so far required for the manufacturing and assembling process. Further, various methods have been adopted as follows: high precisely formed worm gears are used to drive the four photosensitive drums (Electro-photography Proceedings, JAPAN HARDCOPY 1991 A-27 p); a mark is described on the surface of the transcribing belt to determine the image write timing (Japanese Published Unexamined (Kokai) Patent Application No. 62-242996); the distance between the image forming units is determined to be an integer times longer than the circumferential length of the pulley for driving the transcription belt (U.S. Pat. No. 4,531,828), etc. Further, the method of deciding the image writing timing by detecting the paper end is disclosed in Japanese Published Unexamined (Kokai) Patent Application No. 59-163971.

However, there exists a limit with respect to an improvement in the mechanical precision when the manufacturing cost is taken into account. Further, even if the precision is increased up to the practicable possible degree, there still exists a problem in that the mal-register due to superposed images exceeds the allowable value, or when the units are exchanged with another one by the user due to change in ambient temperature for instance, since the distance between the image forming units changes, the mal-register rate in the color image inevitably increases.

Further, in the above-description, although the tandem color image forming apparatus has been explained by way of example, in the case where the single image forming unit of the color image forming apparatus functions as a monochromatic image forming apparatus (not as the color image forming apparatus), there exists the same common problem as in the color image forming apparatus. That is, when the rotative speed of the photosensitive drum fluctuates or the photosensitive drum has an eccentricity, the banding occurs even in the monochromatic image forming apparatus.

As described above, in the conventional monochromatic or color image forming apparatuses, in order to suppress the shade non-uniformity in the monochromatic image and the mal-register in the color image formed by the image forming apparatus, the manufacturing precision and assembling precision of the composing elements have been both retained extremely high, so that there exists a problem in that a complicated fine adjustment work is required in the assembling process or it is impossible to reduce the shade non-uniformity in the monochromatic image or the mal-register in the color image below an unnoticeable level due to a limit of precision in the assembling work. In addition, since the mal-register has been reduced in dependence upon only the higher precision of the mechanical parts or elements, even if the initial mal-register can be reduced in the color image, there exists a problem in that the image quality is deteriorated with the passage of time due to occurrence of the wear or play in the sliding portions of the mechanical parts.

Further, in the case of the tandem color image forming apparatus, in order to suppress the mal-register caused when the monochromatic images formed by the respective image forming units are superposed, an extremely high precision has been so far required to manufacture and assemble the composing elements of the units, so that there exists a problem in that a complicated fine adjustment work is required in the assembling process or it is impossible to reduce the shade non-uniformity in the monochromatic image or the mal-register in the color images below an unnoticeable level due to a limit of precision in the assembling work. In addition, since the mal-register has been reduced in dependence upon only the higher precision of the mechanical parts or elements, even if the initial mal-register can be reduced in the color images, there exists a problem in that the image quality is deteriorated with the passage of time due to occurrence of the wear or play in the sliding portions of the mechanical parts.

Accordingly, it has been difficult to keep the conventional tandem image forming apparatus under excellent color image registration conditions for many hours, and in addition the manufacturing cost thereof has been high because of the highly precise mechanical parts. For the above-mentioned reasons, the color image forming apparatus has been so far used only as a printing unit for a full color copying machine which is high in cost and can be maintained by the aid of a service man.

In other words, since the current requirements of the color image forming apparatus are maintenance-free and lower-cost as compared with the copying machine, the conventional tandem method cannot be applied to the color printer apparatus.

SUMMARY OF THE INVENTION

Accordingly, it is the object of the present invention to provide an image forming apparatus which can retain a stable and high image quality for many hours without use of any high precise mechanical parts or elements and without causing any non-uniformity and mal-registration in color image.

To achieve the above-mentioned objects, the present invention provides an image forming apparatus for forming an image by recording image information and transcribing the recorded image information on an image transcribing medium, which comprises: an image recording medium for recording the image information; a rotational driving mechanism for driving said image recording medium; image recording means for recording an image repeatedly on said rotating image recording medium in a direction perpendicular to a rotational direction of said image recording medium; rotation detecting means for detecting angular travel rates of said image recording medium; and recording timing control means for controlling recording timing at which the image is started to be recorded in the direction perpendicular to the rotational direction of said image recording medium, on the basis of the angular travel rates detected by said rotation detecting means.

The recording timing control means controls the recording timing so that the image recorded on said image recording medium can be transcribed on the image transcribing medium at regular intervals in a feed direction of the image transcribing medium.

The rotation detecting means is mounted on a drive shaft of said image recording medium to detect angular positions of the drive shaft.

The image recording means includes optical beam scanning and recording means for rotating a rotary polygonal mirror to scan an optical beam in the direction roughly perpendicular to the rotational direction of said image recording medium and for recording an image on said image recording medium by turning on and off the optical beam; and said recording timing control means includes scanning speed control means for controlling scanning speed of the optical beam on the basis of the angular travel rates detected by said rotation detecting means.

The optical beam scanning and recording means includes polygonal mirror rotation detecting means for detecting angular travel rates of said rotary polygonal mirror; and said recording timing control means includes on-off timing control means for controlling the timing at which the optical beam is turned on and off, on the basis of the angular travel rates detected by said polygonal mirror rotation detecting means.

Further, the present invention provides an image forming apparatus for forming an image by recording image information and transcribing the recorded image information on an image transcribing medium, which comprises: an image recording medium for recording the image information; a rotational driving mechanism for driving said image recording medium; image recording means for recording an image repeatedly on said rotating image recording medium in a direction perpendicular to a rotational direction of said image recording medium; rotation detecting means for detecting angular travel rates of said image recording medium; recording timing control means for controlling recording timing at which the image is started to be recorded in the direction perpendicular to the rotational direction of said image recording medium; memory means for previously storing fluctuations in angular travel rates of said image recording medium; calculating means for calculating predicted mal-register rates at a transfer position at which the image recorded on said image recording medium is transcribed onto the image transcribing means, on the basis of the fluctuations in the angular travel rates stored in said memory means; and correcting means for correcting the recording timing on the basis of the calculated mal-register rates at the transfer position.

The rotation detecting means is mounted on a drive shaft of said image recording medium to detect angular positions of the drive shaft.

The rotational driving mechanism comprises a plurality of mutually connected rotational driving elements, a time required to rotate the rotational driving elements by one revolution being determined to be 1/integer times of a time required to rotate the image recording medium by one revolution.

The image recording means includes optical beam scanning and recording means for rotating a rotary polygonal mirror to scan an optical beam in the direction roughly perpendicular to the rotational direction of said image recording medium and for recording an image on said image recording medium by turning on and off the optical beam; and said recording timing control means includes scanning speed control means for controlling scanning speed of the optical beam on the basis of the angular travel rates detected by said rotation detecting means.

The optical beam scanning and recording means includes polygonal mirror rotation detecting means for detecting angular travel rates of said rotary polygonal mirror; and said recording timing control means includes on-off timing control means for controlling the timing at which the optical beam is turned on and off, on the basis of the angular travel rates detected by said polygonal mirror rotation detecting means.

Further, the present invention provides a color image forming apparatus for forming a color image by recording image information and transcribing the recorded image information on an image transcribing medium, which comprises: a plurality of image forming units arranged in a feed direction of the image transcribing medium, each of said image forming units including: an image recording medium for recording the image information; a rotational driving mechanism for driving said image recording medium; image recording means for recording an image repeatedly on said rotating image recording medium in a direction perpendicular to a rotational direction of said image recording medium; and rotation detecting means for detecting angular travel rates of said image recording medium; and recording timing control means for controlling recording timing at which the image is started to be recorded in the direction perpendicular to the rotational direction of said image recording medium, on the basis of the angular travel rates detected by said rotation detecting means.

The image forming unit comprises position detecting means for detecting that the image transcribing medium is fed to a predetermined position, the recording timing being controlled on the basis of a position signal detected by said position detecting means and an angular travel rate detected by said rotation detecting means.

The position detecting means is provided for each of said image forming units.

The position detecting means detects that the image transcribing medium is fed to the predetermined position by detecting that a mark described on a feeding medium for feeding the image transcribing medium is passed through the predetermined position.

The recording timing control means controls the recording timing so that the image recorded on said image recording medium can be transcribed on the image transcribing medium at regular intervals in a feed direction of the image transcribing medium.

The rotation detecting means is mounted on a drive shaft of said image recording medium to detect angular positions of the drive shaft.

The image recording means includes optical beam scanning and recording means for rotating a rotary polygonal mirror to scan an optical beam in the direction roughly perpendicular to the rotational direction of said image recording medium and for recording an image on said image recording medium by turning on and off the optical beam; and said recording timing control means includes scanning speed control means for controlling scanning speed of the optical beam on the basis of the angular travel rates detected by said rotation detecting means.

The optical beam scanning and recording means includes polygonal mirror rotation detecting means for detecting angular travel rates of said rotary polygonal mirror; and said recording timing control means includes on-off timing control means for controlling the timing at which the optical beam is turned on and off, on the basis of the angular travel rates detected by said polygonal mirror rotation detecting means.

Further, the present invention provides a color image forming apparatus for forming a color image by recording image information and transcribing the recorded image information on an image transcribing medium, which comprises: a plurality of image forming units arranged in a feed direction of the image transcribing medium, each of said image forming units including: an image recording medium for recording the image information; a rotational driving mechanism for driving said image recording medium; image recording means for recording an image repeatedly on said rotating image recording medium in a direction perpendicular to a rotational direction of said image recording medium; and rotation detecting means for detecting angular travel rates of said image recording medium; recording timing control means for controlling recording timing at which the image is started to be recorded in the direction perpendicular to the rotational direction of said image recording medium; memory means for previously storing fluctuations in angular travel rates of said image recording medium; calculating means for calculating predicted mal-register rates at a transfer position at which the image recorded on said image recording medium is transcribed onto the image transcribing means, on the basis of the fluctuations in the angular travel rates stored in said memory means; and correcting means for correcting the recording timing on the basis of the calculated mal-register rates at the transfer position.

The image forming unit comprises position detecting means for detecting that the image transcribing medium is fed to a predetermined position, the recording timing being controlled on the basis of a position signal detected by said position detecting means and an angular travel rate detected by said rotation detecting means.

The position detecting means is provided for each of said image forming units.

The position detecting means detects that the image transcribing medium is fed to the predetermined position by detecting that a mark described on a feeding medium for feeding the image transcribing medium is passed through the predetermined position.

The rotation detecting means is mounted on a drive shaft of said image recording medium to detect angular positions of the drive shaft.

The rotational driving mechanism comprises a plurality of mutually connected rotational driving elements, a time required to rotate the rotational driving elements by one revolution being determined to be 1/integer times of a time required to rotate the image recording medium by one revolution.

The image recording means includes optical beam scanning and recording means for rotating a rotary polygonal mirror to scan an optical beam in the direction roughly perpendicular to the rotational direction of said image recording medium and for recording an image on said image recording medium by turning on and off the optical beam; and said recording timing control means includes scanning speed control means for controlling scanning speed of the optical beam on the basis of the angular travel rates detected by said rotation detecting means.

The optical beam scanning and recording means includes polygonal mirror rotation detecting means for detecting angular travel rates of said rotary polygonal mirror; and said recording timing control means includes on-off timing control means for controlling the timing at which the optical beam is turned on and off, on the basis of the angular travel rates detected by said polygonal mirror rotation detecting means.

In the image forming apparatus according to the present invention, the angular travel rates of the image recording medium are detected by the rotation detecting means; the control signals are generated whenever the detected angular travel rates reach a predetermined value; and the timing at which the image is started to be recorded in the direction (the main scanning direction) perpendicular to the rotational direction of the image recording medium is controlled by the recording timing control means. Therefore, even if the rotational speed of the image recording medium fluctuates, it is possible to control the recording timing at which the image is started to be recorded in the main scanning direction of the image recording medium so that the image to be transcribed onto the image transcribing medium can be arranged at regular intervals in the rotational direction (sub-scanning direction) of the image recording medium, with the result that it is possible to eliminate the non-uniformity and the mal-register in the formed image.

Further, in the image forming apparatus according to the present invention, when the rotational speed of the image recording medium fluctuates, errors for one revolution between the ideal angular travel rates and the actual angular travel rates at the respective angular positions of the image recording medium are previously stored in the memory means; the predicted mal-register rates at the transfer position due to the rotational speed fluctuations of the image recording medium are calculated by the calculating means on the basis of the errors in the angular travel rates stored in the memory means; and the mal-register rates at the transfer point are corrected by the correcting means. Therefore, even when the angular travel rates of the image recording medium fluctuate from when the image is formed on the image recording medium to when the formed image is transcribed on the image transcribing medium, it is possible to correct the recording timing so as to eliminate the mal-register at the transfer point.

Further, in the image forming apparatus according to the present invention, the angular position of the drive shaft of the image recording medium is detected instead of detecting the angular travel rates on the surface of the image recording medium; and the rotation detecting means is mounted on the drive shaft of the image recording medium. Therefore, in spite of the simple construction of the rotation detecting means, it is possible to effectively reduce the mal-register due to the angular velocity fluctuations of the image recording medium.

Further, in the image forming apparatus according to the present invention, a time required to rotate each of a plurality of the rotational driving elements for constituting the rotational driving mechanism by one revolution is determined to be 1/integer times of a time required to rotate the image recording medium by one revolution. Therefore, the period of the rotational fluctuations of the respective rotational driving elements becomes 1/integer times of the period of the rotational fluctuations of the image recording medium (the fluctuations are obtained by adding the fluctuations of these rotational driving elements), and thereby the rotational fluctuation data obtained for only one period of the rotational fluctuations of the image recording medium are sufficient as the measurement data required to predict the mal-register at the transfer point. As a result, it is possible to shorten the measurement time and thereby to reduce the capacity of the memory medium.

Further, in the image forming apparatus according to the present invention, since the optical (e.g., laser) beam scanning and recording means is adopted as the image recording means and thereby since the intensity of light for recording an image on the image recording medium can be increased, it is possible to record the image at multistage as a clear image. Further, the failure rate of the image recording means can be reduced, as compared with when a great number of LEDs are arranged. Further, since the scanning speed of the optical beam is controlled by the scanning speed control means on the basis of the angular travel rates detected by the rotation detecting means, it is possible to control the timing at which the image is recorded in the main scanning direction.

Further, in the image forming apparatus according to the present invention, it is possible to control the turn-on and -off timing of the optical beam by the on-off timing control means on the basis of the angular travel rates of the polygonal mirror detected by the polygonal mirror rotation detecting means. As a result, even when the scanning speed of the optical beam is controlled by the scanning speed control means, it is possible to prevent the image from being expanded or contracted in the main scanning direction.

Further, in the color image forming apparatus according to the present invention, the angular travel rates of the image recording medium are detected by the rotation detecting means; and the timing at which the image is started to be recorded in the direction (the main scanning direction) perpendicular to the rotational direction of the image recording medium is controlled by the recording timing control means. Therefore, even if the rotational speed of the image recording medium fluctuates, it is possible to control the recording timing at which the image is started to be recorded in the main scanning direction of the image recording medium so that the image to be transcribed onto the image transcribing medium can be arranged at regular intervals in the rotational direction (sub-scanning direction) of the image recording medium, with the result that it is possible to eliminate the non-uniformity and the mal-register in the formed color image obtained by superposing the respective primary color images.

Further, in the color image forming apparatus according to the present invention, since the image forming unit comprises the position detecting means for detecting that image transcribing medium is fed to a predetermined position, the recording timing is controlled on the basis of both the position signal detected by the position detecting means and the angular travel rates detected by the rotation detecting means. Therefore, even if the image recording medium and the image transcribing medium are both driven unstably, it is possible to extremely reduce the mal-register in the color image formed by superposing the respective primary color images.

Further, in the color image forming apparatus according to the present invention, since the position detecting means is provided for each of a plurality of image forming units, it is possible to determine the recording timing for each of the image forming units in synchronism with the detection signal of the respective position detecting means. Therefore, if the mounting precision of the respective image forming units is low, it is possible to eliminate the mal-register in the color image.

Further, in the color image forming apparatus according to the present invention, since the mark recorded on the feeding medium for feeding the image transcribing medium is detected, it is possible to detect simply and securely that the image transcribing medium is fed to the predetermined position.

Further, in the color image forming apparatus according to the present invention, when the rotational speed of the image recording medium fluctuates, errors for one revolution between the ideal angular travel rates and the actual angular travel rates at the respective angular positions of the image recording medium are previously stored in the memory means; the predicted mal-register rates at the transfer position due to the rotational speed fluctuations of the image recording medium are calculated by the calculating means on the basis of the errors in the angular travel rates stored in the memory means; and the mal-register rates at the transfer point are corrected by the correcting means. Therefore, even when the angular travel rates of the image recording medium fluctuate from when the image is formed on the image recording medium to when the formed image is transcribed on the image transcribing medium, it is possible to correct the recording timing so as to eliminate the mal-register at the transfer point.

Further, in the color image forming apparatus according to the present invention, the angular position of the drive shaft of the image recording medium is detected instead of detecting the angular travel rates on the surface of the image recording medium; and the rotation detecting means is mounted on the drive shaft of the image recording medium. Therefore, in spite of the simple construction of the rotation detecting means, it is possible to effectively reduce the mal-register due to the angular velocity fluctuations of the image recording medium.

Further, in the color image forming apparatus according to the present invention, a time required to rotate each of a plurality of the rotational driving elements for constituting the rotational driving mechanism by one revolution is determined to be 1/integer times of a time required to rotate the image recording medium by one revolution. Therefore, the period of the rotational fluctuations of the respective rotational driving elements becomes 1/integer times of the period of the rotational fluctuations of the image recording medium (the fluctuations are obtained by adding the fluctuations of these rotational driving elements), and thereby the rotational fluctuation data obtained for only one period of the rotational fluctuations of the image recording medium are sufficient as the measurement data required to predict the mal-register at the transfer point. As a result, it is possible to shorten the measurement time and thereby to reduce the capacity of the memory medium.

Further, in the color image forming apparatus according to the present invention, since the optical (e.g., laser) beam scanning and recording means is adopted as the image recording means and thereby since the intensity of light for recording an image on teh image recording medium can be increased, it is possible to record the image at multistage as a clear image. Further, the failure rate of the image recording means can be reduced, as compared with when a great number of LEDs are arranged. Further, since the scanning speed of the optical beam is controlled by the scanning speed control means on the basis of the angular travel rates detected by the rotation detecting means, it is possible to control the timing at which the image is recorded in the main scanning direction.

Further, the color image forming apparatus according to the present invention, it is possible to control the turn-on and -off timing of the optical beam by the on-off timing control means on the basis of the angular travel rates of the polygonal mirror detected by the polygonal mirror rotation detecting means. As a result, even if the scanning speed of the optical beam is controlled by the scanning speed control means, it is possible to prevent the image from being expanded or contracted in the main scanning direction.

BRIEF DESCRIPTION OF THE DRAWINGS

FIG. 8 is a view for assistance in explaining a method of detecting and storing fluctuations in angular travel rate of the photosensitive drum in a second embodiment according to the present invention;

FIG. 9 is a timing chart for assistance in explaining a method of detecting the fluctuations in angular travel rate of the photosensitive drum;

FIG. 10 is an illustration showing an example of the fluctuation data in the detected angular travel rates;

FIG. 11 is a timing chart for assistance in explaining a method of correcting the mal-register at the transfer point in the embodiment of the present invention;

FIG. 12 is a cross-sectional view showing a method of mounting an encoder of the embodiment according to the present invention;

FIG. 30 is a block diagram for assistance in explaining a method of correcting the mal-register at the transfer point of the sixth embodiment of the present invention; and FIG. 31 is a flowchart for assistance in explaining the method of correcting the mal-register at the transfer point of the sixth embodiment of the present invention.

DETAILED DESCRIPTION OF THE PREFERRED EMBODIMENTS

Embodiments of the color image forming apparatus according to the present invention will be described in detail hereinbelow with reference to the attached drawings. Further, in the following description, only a tandem color image forming apparatus will be described. However, it is apparent that a monochromatic image forming apparatus can be realized with the use of a monochromatic image forming unit of the tandem color image forming apparatus. Further, in general, the terminology "register" implies exact matching in position of pages, lines, etc. on opposite sides of a single sheet or exact imposition of successive colors printed over each other. In this specification, however, the terminology "mal-register" implies mismatching (including both the offset and vibrations) caused when images are formed at the exposure point and at the transfer point of the monochromatic or color image forming apparatus.

A first embodiment of the tandem color image forming apparatus is described hereinbelow. The feature of this first embodiment is that linear recording means (print bar) is controlled on the basis of a signal indicative of angular travel rates of a photosensitive drum (image recording medium).

Figure 1:
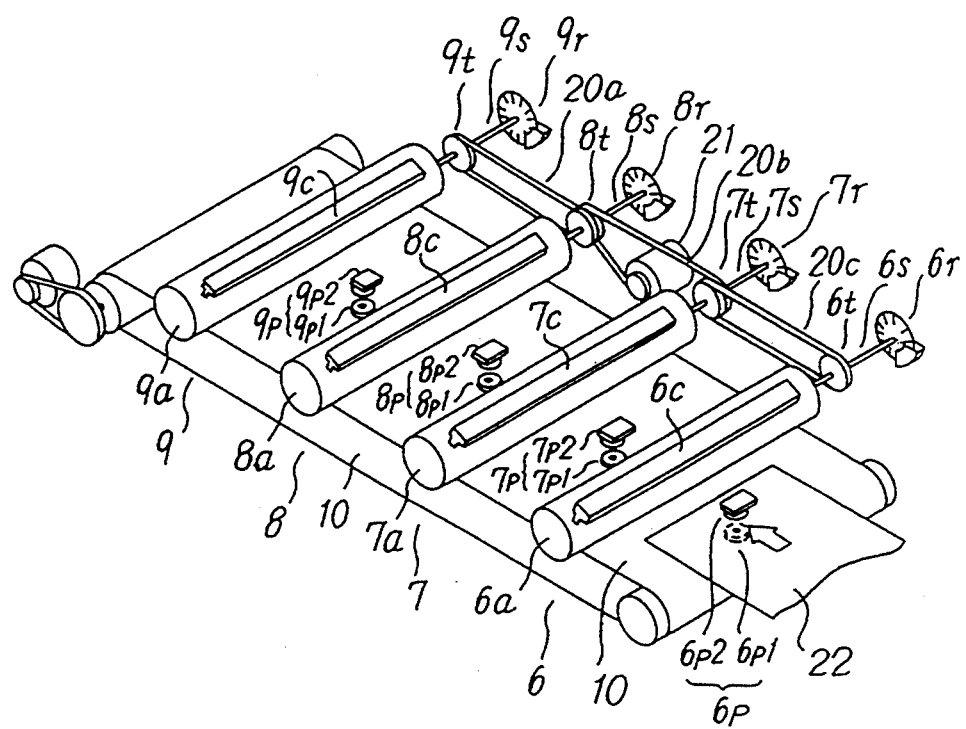
FIG. 1 is a diagrammatical perspective view showing an embodiment of the color image forming apparatus according to the present invention.

The feature is explained in more practical way with reference to FIG. 1, in which an electrophotography is adopted as the recording method.

As already explained under the Description of Prior Art, in the tandem color image forming apparatus, a few monochromatic image forming units are arranged in the paper feeding direction. In the embodiment of the present invention, four rotary encoders 6r, 7r, 8r and 9r are attached to four photosensitive drum shafts 6s, 7s, 8s and 9s of the respective image forming units, respectively. Further, four timing pulleys 6t, 7t, 8t and 9t are mounted on the drum shafts, and three timing belts 20a, 20b and 20c are wound around these four timing pulleys, respectively. Therefore, four photosensitive drums 6a, 7a, 8a and 9a can be driven by a motor 21 via these timing belts 20a, 20b and 20c, respectively.

In the image formation of the respective image forming units, the respective surfaces of the photosensitive drums are charged uniformly with the use of charging units (not shown), and then the charged surface (which corresponds to an image area) is selectively exposed to light with the use of a print bar 6c, 7c, 8c or 9c, to form an electrostatic latent image. In this embodiment, LEDs (light emitting diodes) are used for the print bar. In this print bar, dot light sources (which correspond to printing pixels) are arranged in a line along the longitudinal direction of the print bar, and the dot light sources are turned on or off according to an image to be formed or printed.

Successively, the electrostatic latent image is developed to a toner image with a developing unit (not shown), and the developed toner image is transcribed onto a paper 22 with a transcribing unit (not shown). As described above, since an image is once formed on the surface of the photosensitive drum and thereafter the formed image is transcribed onto a paper, conventionally, when the rotative speed of the photosensitive drum fluctuates, the formed image is subjected to be disordered. Therefore, when the monochromatic images formed by the respective image forming units are superposed or overlapped, color mal-register, line offset and banding are easily produced in the formed color image and thereby the color print is deteriorated in image quality.

As the photosensitive drum driving mechanism of this embodiment, a DC brushless motor 21 of PLL (phase locked loop) control and timing belt transmission mechanisms 20a, 20b, and 20c are used. The reasons why these driving mechanisms are adopted are: 1) these mechanisms are small in size so that the apparatus can be reduced in total size; and 2) the number of parts is relatively small and thereby the cost thereof is relatively low. In the case of the timing belt transmission mechanisms, however, there exists a problem in that it is rather difficult to drive the photosensitive drum at a constant speed accurately, because of an eccentricity of the timing pulley with respect to the drum shaft, a mal-concentricity of the pitch circle diameter, an accumulated pitch error of the pulley gears, the speed fluctuations due to mesh between the pulley grooves and the belt gears, etc. The above-mentioned pulley eccentricity, the diameter mal-concentricity, and the accumulated gear error cause long-period speed fluctuations and thereby result in the mal-register in the color image when the monochromatic images are superposed upon each other. On the other hand, the mesh fluctuations cause short-period fluctuations and thereby result in banding.

Figure 4:
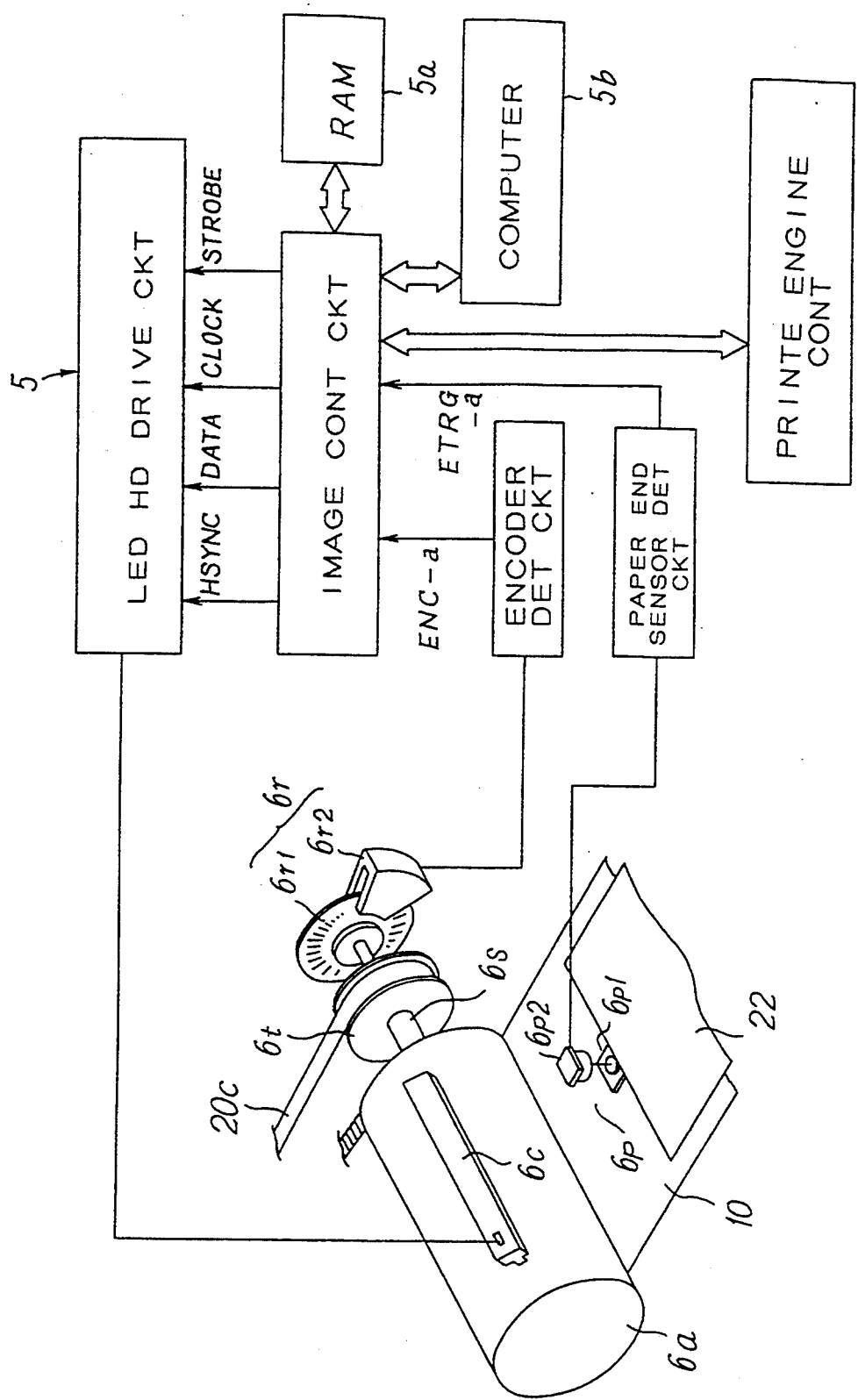
FIG. 4 is a diagrammatical perspective view and a circuit block diagram showing an image forming unit of a first embodiment of the color image forming apparatus according to the present invention.
Figure 5:
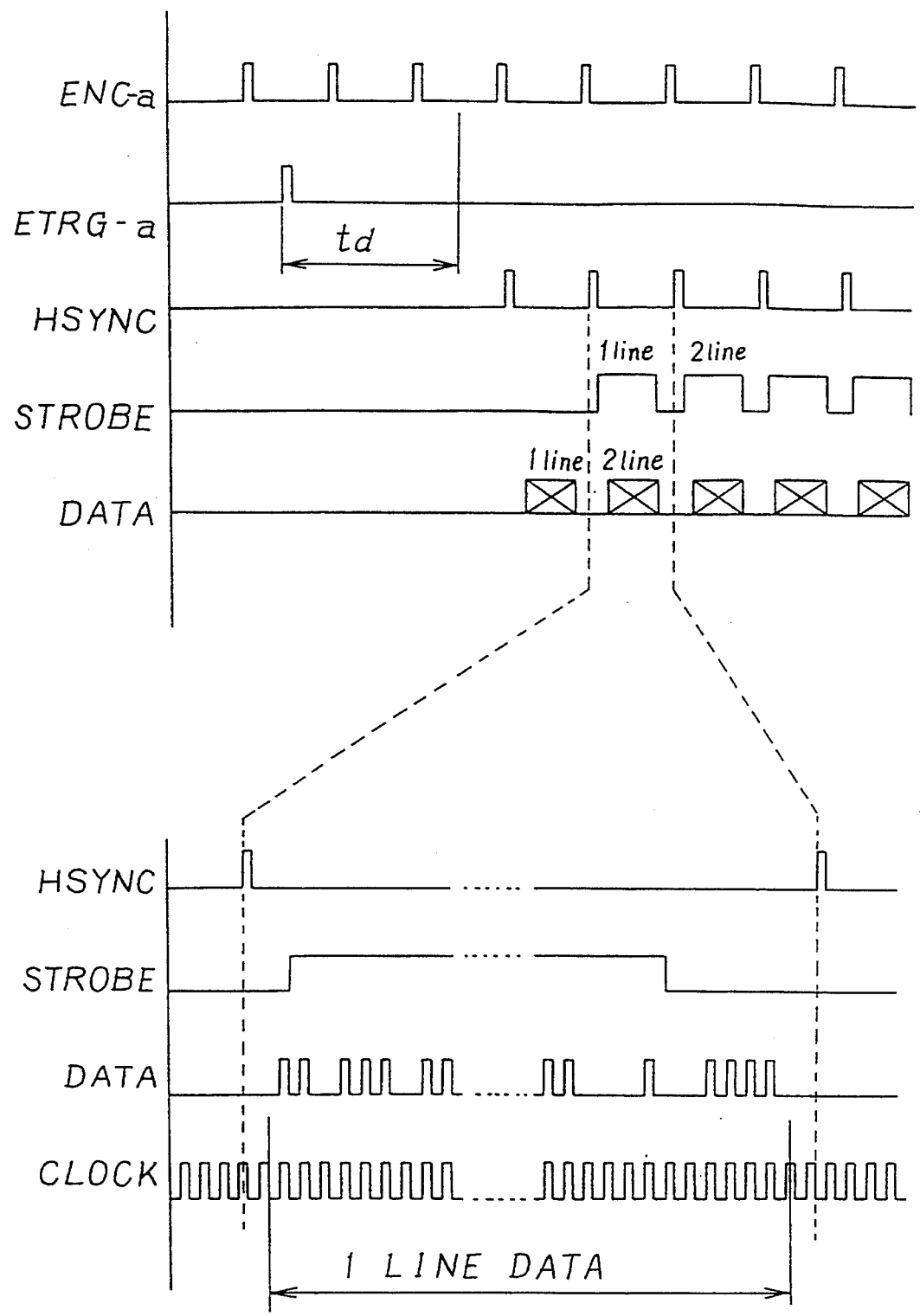
FIG. 5 is a timing chart showing the respective signal timings of the embodiment according to the present invention.

To improve the above-mentioned image deterioration due to the rotative speed fluctuations of the photosensitive drum; that is, to obtain a high-quality image, the present embodiment is constructed as follows:

For brevity, FIG. 4 shows only a yellow image forming unit of the four image forming units and a control circuit therefor, and FIG. 5 shows the timing chart thereof.

In FIG. 4, record timing control means 5 controls the recording timing at which an image is started to be recorded in a direction (the main scanning direction) perpendicular to the rotative direction of the image recording medium in accordance with the angular travel rates of the recording medium (photosensitive drum) detected by rotation detecting means (rotary encoder). In more detail, an image control circuit of the recording timing control means 5 is a circuit for controlling the input and output of the image information data. That is, the image control circuit receives one-page image information data obtained by a computer, develops the received data to image dot data, and further transfers the image dot data (DATA) for one-line of the LED head to an LED head drive circuit in synchronism with a clock signal (CLK). Upon reception of one-line image data, the LED head drive circuit latches the received image data temporarily in response to a horizontal synchronizing signal (HSYNC) transmitted by the image control circuit, and then activates the LEDs by light emitting signals (STROBE) in synchronism with the horizontal synchronizing signal (HSYNC). The LED emissions for the preceding line data are executed simultaneously during the reception of the succeeding line data. Although being housed within the LED head body 6c in practice, in FIG. 4, the drive circuit is shown outside the LED head body 6c.

The rotary encoder 6r (rotation detecting means) mounted on the photosensitive drum shaft 6s is composed of a code wheel 6r1 formed with slits extending in the radial direction and arranged in the circumferential direction and a detecting section 6r2 having a light source and a light receiving element both disposed so as to be opposed to each other. The detecting section 6r2 is an encoder module of YHP (YOKOKAWA) Corp., for instance. Here, although the smaller slit pitch is preferable in the code wheel, the slit pitch is determined so as to become the same resolution as that of the printer under due consideration of cost thereof. In practice, since the diameter of the photosensitive drum is $\Phi = 30$ mm and the printer resolution is 300 dpi (300 dots per inch), 1113 slits are arranged in the circumferential direction of the code wheel.

The signals of the detecting section 6r2 are once acquired by an encoder detecting circuit, and then transferred to the image control circuit as an ENC-a signal. In synchronism with this ENC-a signal, the image control circuit outputs a HSYNC signal, so that the LED head can be driven in synchronism with the encoder signal.

Figure 6:
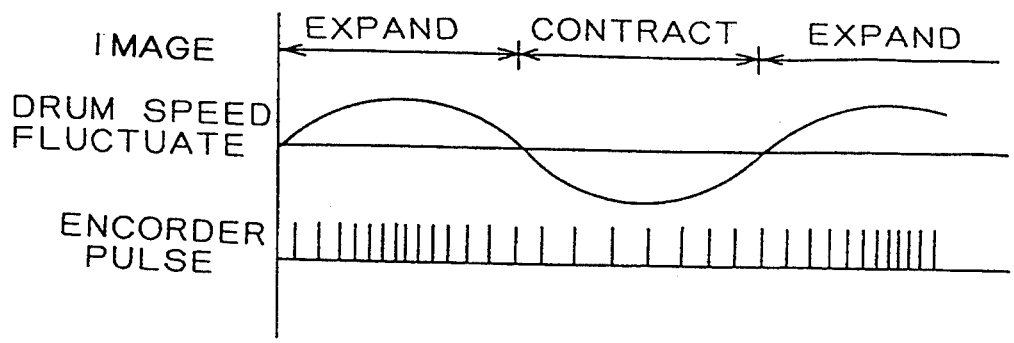
FIG. 6 is an illustration for assistance in explaining the relationship between speed fluctuations of a photosensitive drum and the encoder pulse.

The above-mentioned driving effect will be described hereinbelow with reference to FIG. 6. As shown in FIG. 6, when the rotative speed of the photosensitive drum 6a fluctuates and the LED head is activated at a constant frequency, the image is expanded at the high speed range but contracted at the low speed range. Under these conditions, the frequency of the encoder pulse signal increases with increasing drum speed and decreases with decreasing drum speed. In other words, when the LED head is driven in synchronism with the encoder pulse, it is possible to form an image at a constant line pitch in proportion to the encoder pitch at all times, even if the photosensitive drum speed fluctuates. Consequently, it is possible to fairly suppress the mal-register and banding due to long-period and short-period fluctuations of the photosensitive drum.

In this embodiment, paper end detecting sensors 6p, 7p, 8p and 9p (as the position detecting means) are provided just ahead of the respective image forming unit 6, 7, 8 and 9. The paper end detecting sensor 6p, 7p, 8p or 9p is composed of a light source 6p1, 7p1, 8p1 or 9p1 (disposed under the transcribing belt 10) and a light receiving element 6p2, 7p2, 8p2, or 9p2 (disposed over the transcribing belt 10), respectively. When a paper 22 is absent, the light of the light source can reach the light receiving element through a transparent transcribing belt 10. However, when a paper 22 is present, since the light of the light source is shaded by the end of the paper, the light receiving element is turned off, so that the paper end can be detected. The output signal of the light receiving elements 6p2, 7p2, 8p2 or 9p2 is inputted to a paper end detecting sensor circuit, and then transmitted to the image control circuit as an ETRG signal. The ETRG signal is outputted for each image forming unit. In FIG. 4, only ETRG-a is shown by way of example.

At the timing as shown in FIG. 5, the image control circuit outputs the horizontal synchronizing signal HSYNC in synchronism with the encoder pulse signal ENC-a after a constant time td after the ETRG signal is received. Here, the constant time td is a time required to adjust a difference between a distance from the light receiving element 6p2 to the transfer position and a distance from the exposure position to the transfer position on the surface of the drum 6a. Accordingly, since the travel distance of the paper 22 (image transcribing medium) can be detected, it is possible to decide the recording timing or the image write timing or the light emitting timing of the print bars 6c, 7c, 8c and 9c, respectively.

Figure 2:
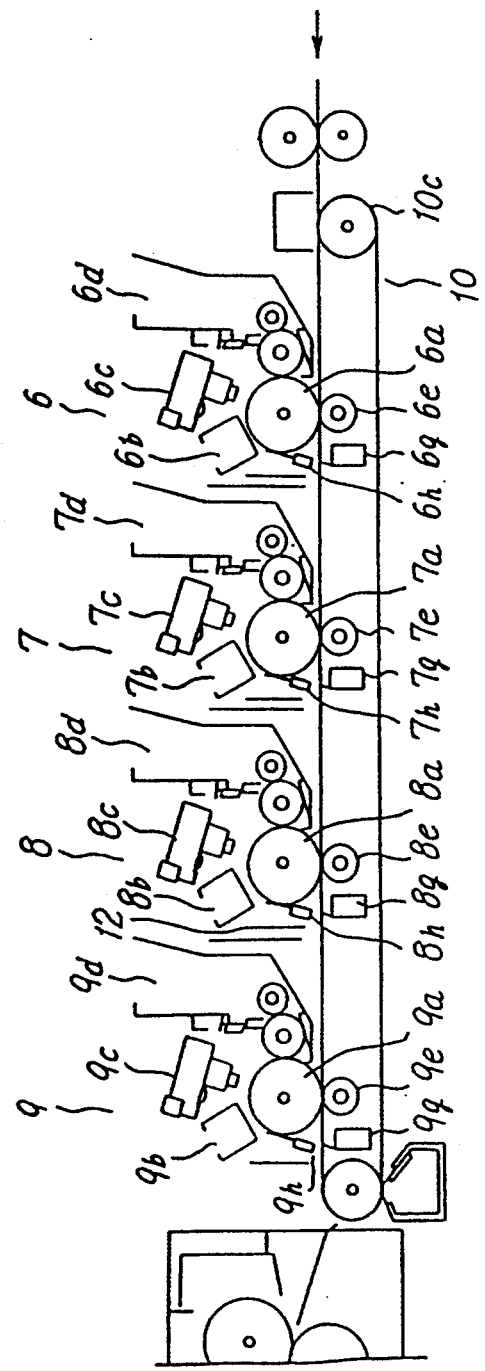
FIG. 2 is a diagrammatical side view showing a conventional electrophotographic tandem color printer.
Figure 3:
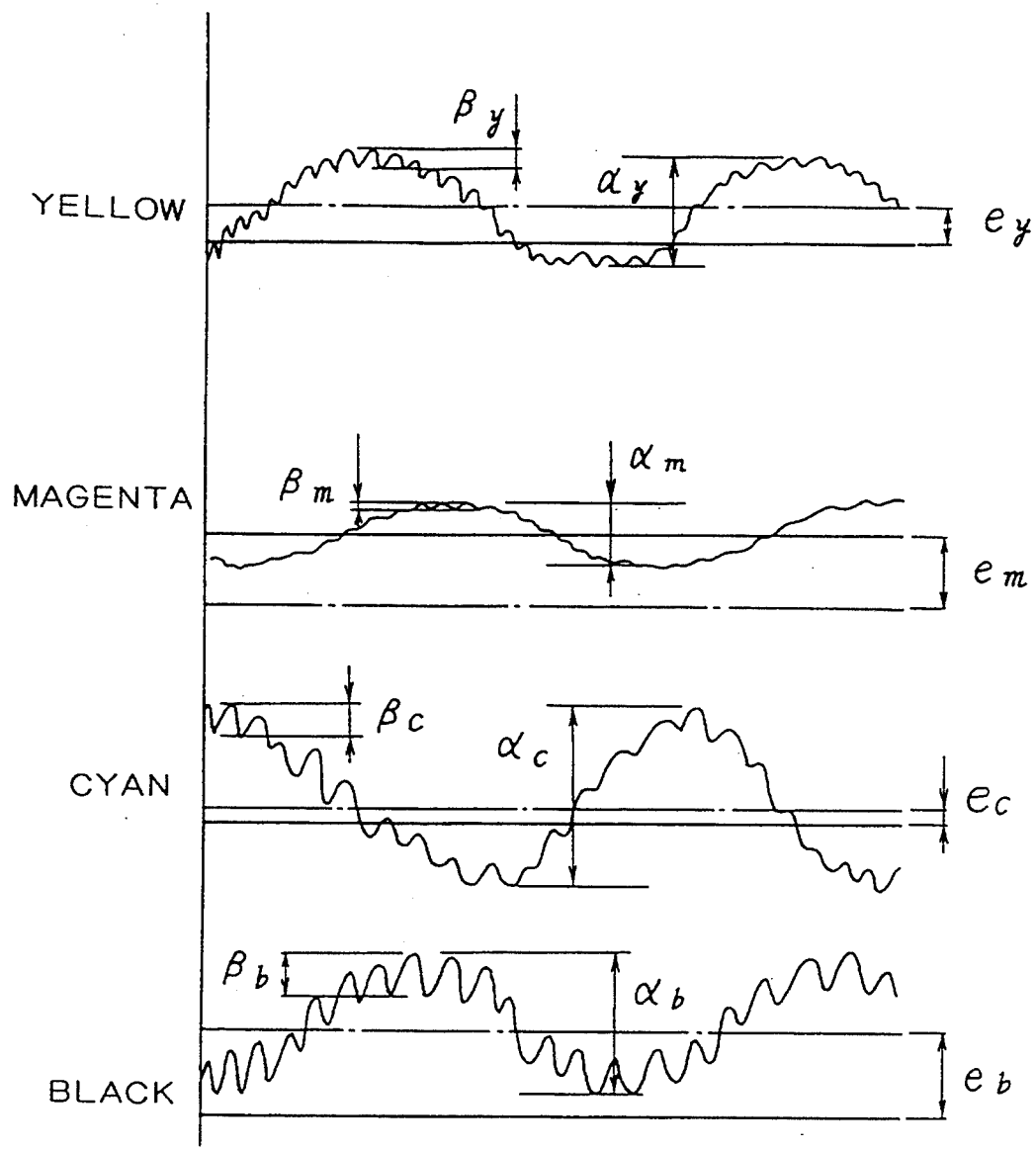
FIG. 3 is an illustration for assistance in explaining the mal-register in color image.

In the case where the transcribing belt 10 is moving at a constant speed and the diameter of the transcribing belt driving roller 10c (shown in FIG. 2) is slightly deviated from the design value, it is impossible to prevent the mal-register of the superposed images in accordance with the conventional method such that a constant image write timing is calculated independently at the respective image forming unit on the basis of the distance between the units and the set speed of the transcribing belt. Therefore, in the conventional method, to reduce the above-mentioned mal-register, it has been necessary to adjust the write timing finely for each unit. In this embodiment, however, the above-mentioned mal-register can be reduced automatically.

In the present embodiment, the angular travel rates of the photosensitive drum 6a can be obtained by the rotary encoder 6r mounted on the photosensitive drum shaft 6s. In addition, the timing at which the print bar 6c begins to emit light in the direction (the main scanning direction) perpendicular to the rotational direction of the photosensitive drum can be controlled by the recording timing control means 5. Therefore, even if the rotative speed of the photosensitive drum shaft 6s fluctuates, it is possible to control the recording timing at which the image is started to be recorded in the main scanning direction on the image recording medium in such a way that the images transcribed onto the paper 22 are arranged at regular intervals in the rotational direction (the sub-scanning direction) of the photosensitive drum 6a, with the result that it is possible to eliminate the non-uniformity in color shade and the mal-register in color image.

Further, in this embodiment, the rotary encoder 6r and the paper end detecting sensor 6p are both provided; and on the basis of both the signals outputted by the encoder 6r and the sensor 6p, the recording timing control means 5 controls the timing at which the print bar 6c is started to be activated in the main scanning direction. Therefore, when the image recording medium and the image transcribing medium are both being driven unstably, it is possible to markedly reduce the mal-register formed by superposing different monochromatic images upon each other. In other words, it is possible to reduce the mal-registers of the color image due to rotative speed fluctuations of the photosensitive drum and due to the irregular paper feeding speed simultaneously.

A second embodiment of the present invention will be described hereinbelow.

In this second embodiment, in order to effectively reduce the mal-register caused at the transfer position due to the fluctuations of the photosensitive drum speed, the rotational speed fluctuations of the photosensitive drum are detected by the encoders and the mal-register rates at the transfer position are calculated prior to the image formation by the LED heads. Further, on the basis of the calculated mal-register rate, the encoder signal is corrected; the timing signal is generated; and the LED head is activated for light emission.

Figure 7:
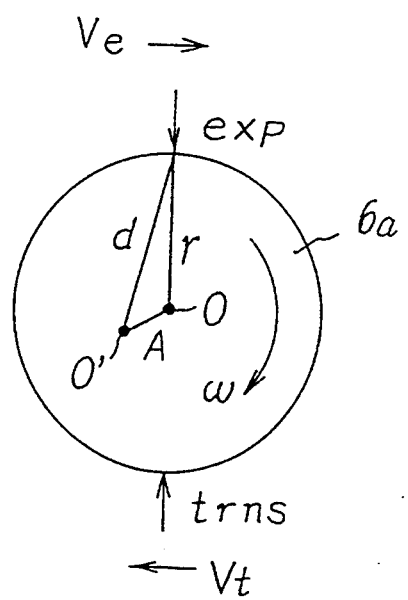
FIG. 7 is a model view for assistance in theoretically explaining the mal-register in the color image caused by the flucutations in angular travel rate of the photosensitive drum.

For explanation of this second embodiment, the fact that the major part of the mal-register due to the rotational fluctuations of the photosensitive drum resuls from fluctuations in the angular velocity of the photosensitive drum 6a (i.e., the eccentricity of the drum hardly exerts the influence upon the mal-register) will be explained theoretically with reference to FIG. 7.

As already explained, the latent image is formed on the photosensitive drum 62 by the LED head at the exposure point exp. Further, the latent image developed into a toner image by the developing unit (not shown) is transcribed onto a paper (not shown) at the transfer point trns. In this model shown in FIG. 7, the assumption is made that the center O of the photosensitive drum 6a is offset from the rotational center O' by a distance A. In FIG. 7, the symbols are designted as follows:

r: radius of the drum
d: distance between the rotational center O' and the exposure point exp
$V_e$: virtual recording velocity (printing head)
$V_f$: paper feed velocity
$\omega$: angular velocity of the drum Here, the fact that an image is formed by emitting light from the LED head at a constant frequency at the exposure point is equivalent to an ideal image with an accurate image pitch transcribed on the surface of the photosensitive drum 6a at the recording speed $V_e$ at the exposure point exp. The virtual recording speed represents the travel speed of this ideal image, and therefore can be considered as a set recording speed.

Further, the following definitions are made:

$t_{del}$: minute time $\omega_e$: angular velocity of the drum (when passing through the exposure point)

$\omega_t$: angular velocity of the drum (when passing through the transfer point)

$\beta$: angular velocity change rate

: angle between exposure and transfer points $\psi$: eccentric angle of the drum f: rotational speed of the drum The mal-register due to the speed fluctuations of the drum can be divided into the mal-register $E_{exp}$ at the exposure point and the mal-register $E_{trn}$ at the transfer point as follows:

$$E_{exp} = V_e \times t_{del} - d \times \omega_e \times t_{del} \quad (1)$$

$$E_{trn} = d \times \omega_t \times t_{del} - V_t \times t_{del} \quad (2)$$

However, the above expressions do not match each other on the same time axis; that is, (1) expresses the mal-register obtained when any given point on the drum reaches the exposure point; and (2) expresses the mal-register obtained when the same point on the drum reaches the transfer point. Accordingly, the mal-register actually obtained when images are transcribed onto the paper is an addition of both.

Further, the distance d between the rotational center O' and the exposure point exp can be expressed as follows:

$$d = A \cos(2\pi \text{ ft} + \psi) + (r^2 + A^2 (\cos^2(2\pi \text{ ft} + \psi) - 1))^{\frac{1}{2}} \quad (3)$$

Here, since $r >> A$, $A^2$ term of (3) can be neglected as $$d = A \cos(2\pi \text{ ft} + \psi) + r \quad (4)$$

In the above expressions (1) and (2), the case is taken into account where 1) the paper feed speed $V_t$ does not fluctuate and therefore is equal to the virtual speed $V_e$, and 2) the drive pulley for driving the drum is eccentric and thereby the angular velocity of the drum fluctuates as follows:

$$\omega_e = W\{1 + \beta \sin(2\pi \text{ ft})\} \quad (5)$$

$$\omega_t = W\{1 + \beta \sin(2\pi \text{ ft}) + \xi\} \quad (6)$$

$$V_e = V_t \quad (7)$$

$$\xi = \pi \quad (8)$$

where W denotes the ideal angular velocity.

Therefore, the mal-register can be expressed as $$\begin{aligned} E_{exp} + E_{trn} &= (V_e - V_t) \times t_{del} + \\ &\quad (w_t - w_e) \times d \times t_{del} \\ &= -2\beta W \sin(2\pi ft) \\ &\quad \{r + A\cos(2\pi ft + \psi)\} \times t_{del} \end{aligned} \quad (9)$$

Further, in the above expression, since A can be negligible in comparison with r, (9) can be expressed as $$E_{exp} + E_{trn} = -2\beta r W \sin(2\pi \text{ ft}) \times t_{del} \quad (10)$$

The above expression (10) indicates that the eccentricity A of the drum 6a hardly exerts influence upon the mal-register, and the mal-register is caused mainly by the fluctuations of the angular velocity.

Further, since the expression (9) is a mal-register during a minute time, the accumulated offset error can be obtained by integrating the expression (9) once.

As described above, the mal-register caused by the rotational fluctuations of the photosensitive drum can be discussed theoretically.

Here, it should be noted that the mal-register is an addition of the error caused at the exposure point and the error at the transfer point as expressed by the expression (9). In other words, in the first embodiment, the mal-register caused at only the exposure point is corrected by activating the LED head in synchronism with the signals of the encoder mounted on the photosensitive drum shaft. Although the mal-register can be reduced fairly, as compared with the conventional method, in the first embodiment it is impossible to eliminate the mal-register caused at the transfer point. That is, since the mal-register still remains at the transfer point, the effect is only that the electrostatic latent image can be formed accurately on the photosensitive drum.

Accordingly, in this second embodiment, the mal-register at the transfer point is further reduced as follows:

The mal-register caused when the image obtained on the surface of the photosensitive drum by exposure of the LED head is transcribed onto a paper reaching the transfer point is first predicted. Further, the timing signal is generated on the basis of encoder signal corrected according to the predicted mal-register rate, and the LED head can be activated in synchronism with the timing signal. In other words, in this second embodiment, the mal-register is corrected at the exposure point by predicting the mal-register at the transfer point. For prediction of the mal-register at the transfer point, prior to activating the LED head, the rotational fluctuations of the photosensitive drum are measured and then recorded in the memory 5a.

The method of measuring the rotational fluctuations of the drum will be described hereinbelow with reference to FIG. 8.

In this embodiment, the encoder is divided into 36 blocks in the circumferential direction, and the divided blocks are designated by 1st, 2nd, . . . beginning from the exposure point. Since the number of encoder pulses is 1113 per circumference, 30 pluses can be obtained by one block.

The encoder signal ENC outputted when the photosensitive drum is being driven is inputted to a timer circuit. This timer circuit processes the signal so as to obtain the timing signal as shown in FIG. 9. That is, the timer circuit generates a signal GATE which repeatedly changes to a high-level at a rise edge of the first pulse of the encoder signal and to a low-level at a rise edge of the 25th pulse thereof for each block. On the other hand, a circuit for counting the clock signal CLOCK when the GATE signal is at the high level is provided, and the count data between 26th and 30th pulses of the encoder signals are transferred to the image control circuit. The image control circuit calculates the time interval $t_{bn}$ between the first pulse and the 25th pulse on the basis of the counted clock data for each block of the encoder and the clock frequency, and further calculates the following expression:

$$d_{tn} = (t_{bn} - t_r)/25$$

where $d_{tn}$: averaged fluctuation pulse time per each block
$t_r$: ideal time obtained when the drum angular velocity is constant
n: block (=1, 2, 3, . . . , 36)

The image control circuit stores the averaged fluctuation pulse times $d_{tn}$ for 36 blocks in a memory (RAM) temporarily. FIG. 10 shows the averaged fluctuation times thereof, which indicates that the period of the averaged fluctuation time $d_{td}$ is roughly the same as the period during which the drum rotates once.

Successively, on the basis of decoded fluctuation time data for each revolution of the drum, the mal-register at the transfer point is predicted, and the timing at which the LED head is activated is corrected as follows:

In the same way as with the case of the first embodiment, the horizontal synchronizing signal HSYNC is generated on the basis of the encoder signal ENC, and the LED head is activated in synchronism with this signal HSYNC. However, a point different from the first embodiment is that the encoder signal ENC is not synchronous with the horizontal synchronizing signal HSYNC.

This will be described in further detail with reference to FIG. 11. As shown, a programmable counter circuit is incorporated in the image control circuit. This counter circuit outputs a horizontal synchronizing signal HSYNC a constant time after the encoder pulse signal ENC has been generated. Further, this delay time can be controlled on the basis of the data inputted from the outside. The delay time is determined on the basis of the fluctuation time data for one period of the encoder which have been already stored. FIG. 11 shows the encoder signals ENC corresponding to the encoder blocks 1 to 3 obtained when the surface of the photosensitive drum is exposed, and the horizontal synchronizing signal HSYNC outputted by the programmable counter circuit. The delay time of encoder signal ENC and the horizontal synchronizing signal HSYNC are changed according to the blocks exposed at the exposure point. The delay time $t_{del}n$ (n: block) can be determined by the following expression:

$$t_{del}n = t_0 + dt(n = 36/2)$$

where $t_0$: a constant delay time
dt(i): fluctuation time of i-block previously recorded In this embodiment, the constant delay time $t_0$ is determined as a time corresponding to two period times of the encoder pulse obtained when the photosensitive drum is rotated under an ideal speed. Further, the delay time fluctuation dt(i) is the fluctuation time of a block opposite to (180 degrees away from) the block now being exposed. The reason is as follows: in the present invention, since an angle between the exposure point and the transfer point is 180 degrees away from each other, when a first angular position now being exposed on the surface of the photosensitive drum reaches the transfer point, a second angular positive thereon 180 degrees away from the first angular position is located at the exposure point. On the assumption that the mal-register rate obtained when an exposed surface of the photosensitive drum passes through the transfer point can be repeatedly reproduced on the basis of the photosensitive drum speed fluctuations, the mal-register at the transfer point is corrected on the basis of the past fluctuation time data, and the electrostatic latent image is formed on the basis of the corrected data. Accordingly, even if the photosensitive drum fluctuates in rotative speed, since the mal-register at the transfer point and that at the exposure point can be corrected simultaneously, it is possible to keep the image pitch at a constant value. In this embodiment, however, the following limit is provided under the restriction of the counter circuit:

$$0 < t_{del}n < 2\, t_0$$

Therefore, the correctable range at the transfer point is ±2 dots.

The delay time $t_{del}$ n is determined for each block, without changing within the same block. However, the effect of correcting the mal-register at the transfer point is little, in such a case that the banding occurs at the transfer point due to a high fluctuation frequency of the photosensitive drum and a relatively wide amplitude thereof so that the period of the mal-register at the transfer point is shorter than the block width. In many cases, however, the amplitudes of the high frequency components of the speed fluctuations of the photosensitive drum are relatively small. In addition, the above-mentioned problem has little influence upon such a wide transfer point of several hundreds μm to several mm, as compared with the small spot diameter of several tens μm (the diameter of the light emitting dot of the LED head) at the exposure point. In other words, the banding produced at the transfer point is so small as to be negligible, as compared with that produced at the exposure point. Therefore, the object of the present invention is to correct the mal-register produced at the transfer point caused by a large-amplitude and long-period fluctuations due to an eccentricity of the drive timing pulley of the photosensitive drum.

Further, the present invention is still sufficiently effective when short-period fluctuations occur at the transfer point. In this case, the encoder is divided into a greater number to measure the speed fluctuations of the photosensitive drum more frequently and thereby to set the delay time of the horizontal synchronizing signal HSYNC more often. In the present invention, even if there exist fluctuations in the angular travel rates of the photosensitive drum between when the image is formed on the drum and when the image is transcribed onto the image transcribing medium, since the image can be formed so as to correct the fluctuations, it is possible to obtain a transcribed image having no mal-register on the image transcribing medium (paper).

A third embodiment of the present invention will be described hereinbelow with reference to FIGS. 1 and 4. The feature of this third embodiment is to mount the encoder for detecting the rotative fluctuations of the photosensitive drum on the drive shaft of the photosensitive drum, respectively.

As already explained, on the basis of the theoretical analysis of the mal-register, in particular on the basis of the expressions (9) and (10), it is possible to understand that the mal-register due to the rotative fluctuations of the photosensitive drum is mainly caused by the rotative angular velocity fluctuations, and the influence of the eccentricity caused when the drum is mounted can be negligible. This embodiment is based upon the above-mentioned consideration.

The encoder is mounted on the drum drive shaft 6s of the photosensitive drum 6a to detect the angular position of this drum drive shaft 6s. In this case, the fluctuations of the angular velocity of the drum shaft 6s can be detected most effectively. Therefore, it is most effective to change the light emitting timing of the LED head on the basis of the detected angular velocity signal. That is, instead of detecting the fluctuations of the angular travel rate of the surface of the photosensitive drum 6a, the angular position of the drum drive shaft 6s of the drum 6a is detected. In this case, since the rotary encoder 6r is mounted on the drive shaft 6s of the drum 6a, it is possible to construct the rotation detecting means simply and to reduce the mal-register due to the fluctuations of the angular velocity most effectively.

On the other hand, when the encoder is mounted on the drum itself or the drum drive pulley, a high mounting precision is required. Otherwise, since the encoder output signal fluctuates due to the mounting error, even if the light emitting timing of the LED head is controlled on the basis of this signal, it is impossible to reduce the mal-register effectively.

FIG. 12 shows a method of mounting the encoder on the drum drive shaft 6s. The drive shaft 6s of the photosensitive drum 6a is rotatably supported by two bearings 33a and 33b fitted to two frames 34a and 34b, respectively. A timing pulley 6t is fixed to a D-shaped (in cross section) cut portion of the drum shaft 6s with a set screw 32, and a drum drive force of a motor (not shown) is transmitted to the timing pulley 6t via a timing belt 20c. A retainer ring 35 is fitted to the drum shaft 6s to prevent the drum shaft 6s from being moved in the thrust direction. The drum shaft 6s is fixed to the drum 6a by pressure fitting an end of the drum shaft 6s into a resin bush 31b of a drum flange 31a via a bush 30b fitted to a frame 30 of the image forming unit.

On the other hand, the encoder must be mounted on the drum shaft 6s so that an eccentric error due to mounting can be reduced as much as possible. Therefore, the drum shaft 6s is tapered at the position at which an encoder wheel 6r1 is to be mounted, and the mounted encoder wheel 6r1 is fixed to the drum shaft 6s with a nut 36. Further, a detecting section 6r2 is located and fixed to the frame 34b.

In the construction as described above, since the angular position of the drum drive shaft 6s is detected instead of detecting the angular travel rate of the surface of the photosensitive drum 6a, and further since the encoder 6r (rotation detecting means) is mounted on the drum shaft 6s of the drum 6a, it is possible to construct the rotation detecting means simply and further to reduce the mal-register due to the fluctuation of the angular velocity of the photosensitive drum 6a most effectively. In addition, the mal-register can be suppressed effectively by changing the light emitting timing of the LED head on the basis of the signal detected by the encoder 6r.

A fourth embodiment of the present invention will be described hereinbelow. The feature of this fourth embodiment is to assemble a paper end detecting sensor for detecting the end of a paper (image transcribing medium) in the respective image forming unit.

Figure 13:
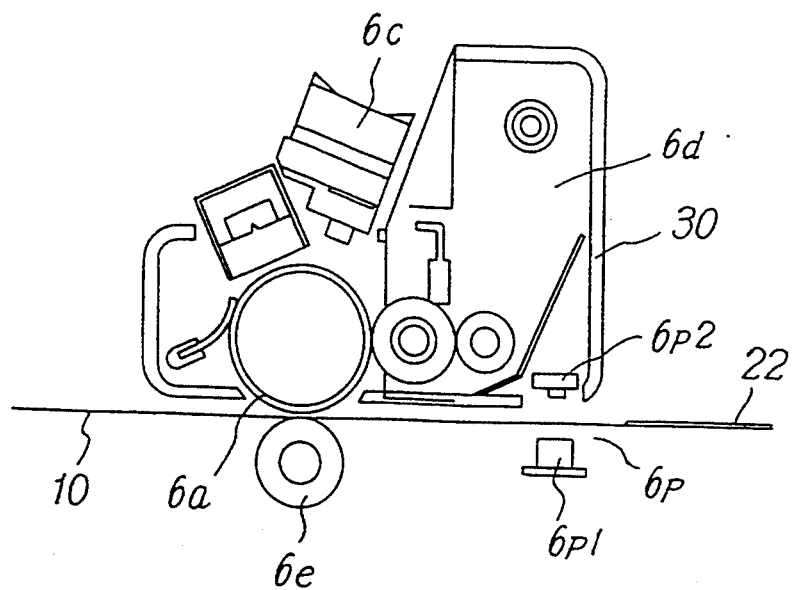
FIG. 13 is a diagrammatical side view showing an image forming unit of a fourth embodiment of the present invention.

As shown in FIG. 13, a light receiving element 6p2 of the paper end detecting sensor for detecting paper 22 is mounted on the image forming unit frame 30. During the manufacturing process of the image forming unit, a distance between the photosensitive drum 6a and the sensor light receiving element 6p2 can be determined at a high precision. Therefore, if the image forming unit is replaced with a new one manually by the user after having been shipped and thereby a mal-register is produced when the image forming unit is mounted on the apparatus body, as far as the write timing of the image forming unit is determined on the basis of the paper end detection signal, it is possible to prevent the mal-register due to an error in distance between the respective image forming units.

In this embodiment, although the light receiving element 6p2 of the paper end detecting sensor is incorporated in the image forming unit, since this light receiving element is costly, this element is not assembled with the image forming unit in the other embodiments.

Figure 14:
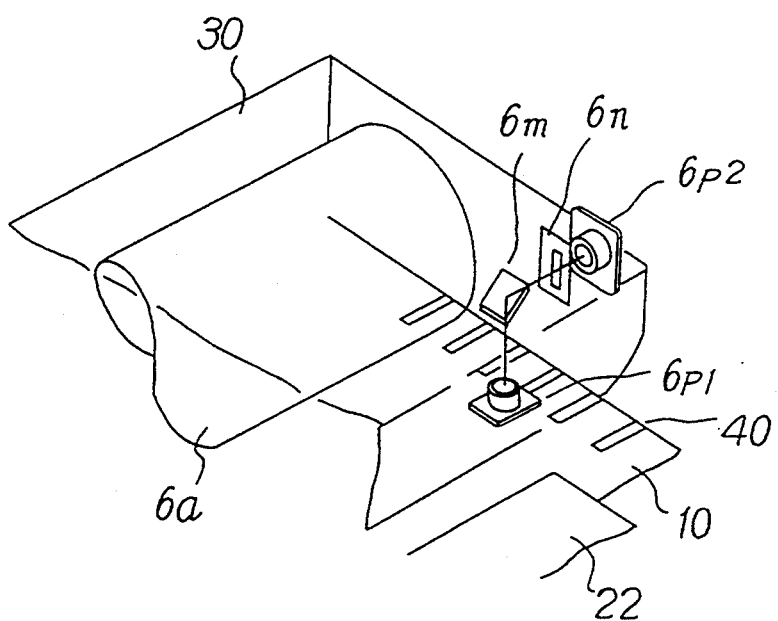
FIG. 14 is a diagrammatical perspective view showing the fourth embodiment according to the present invention.
Figure 15:
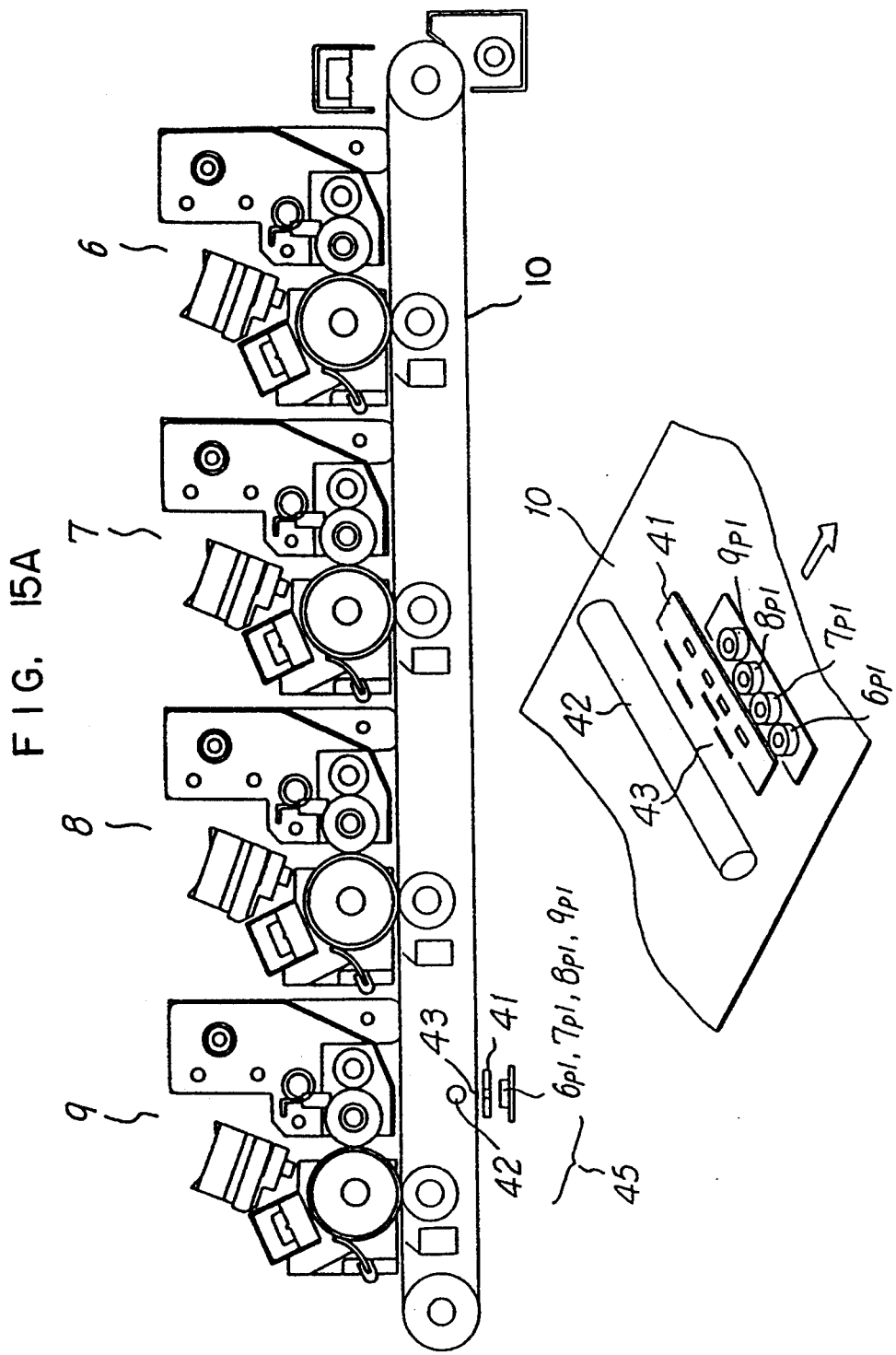
FIGS. 15(a) and 15(b) show a modification of the fourth embodiment of the present invention.

The structure of this embodiment will be described in further detail with reference to FIG. 14. A mirror 6m and a slit plate 6n are assembled in the image forming unit frame 30. Then, light emitted from a light source 6p1 is passed through a transcription belt 10, refracted by the mirror 6m, passed through the slit plate 6n, and then reaches the light receiving element 6p2 mounted on the body frame (not shown). Therefore, when the paper 22 is passed between the light source 6p1 and the mirror 6m, the end of the paper 22 can be detected.

In this embodiment, as far as the distance between the photosensitive drum 6a and the slit plate 6n is precisely determined in the image forming unit, there exists no problem. Further, in the above-mentioned description, although the write timing of the image forming unit is determined on the basis of the end of the paper 22, without being limited thereto, it is possible to obtain the same effect by detecting a mark 40 (shown in FIG. 14) described on the transcription belt 10. Further, it is also possible to adopt such a method that the first image forming unit prints the mark 40 on the transcription belt, and thereafter the printed mark is detected.

The modification of the above fourth embodiment will be described hereinbelow. In the above-mentioned embodiment, the angular travel rate of the image transcribing medium (paper) is detected by detecting the end of a paper or a mark on the transcribing belt, to determine the write timing of the respective image forming units on the basis of the detected signal. However, the write timing is not limited to only the above-mentioned methods. That is, other methods as described below can be adopted.

The modifications of this embodiment will be described with reference to FIGS. 15(a) to 20.

In this modification, the image write timings by the respective image forming units are determined by detecting timing marks (printed on the surface of the transcribing belt by the respective image forming units) with the use of timing mark detecting means 45. The timing marks are detected prior to the transcribing process onto the paper so that the respective mal-register rates can be corrected by changing the write timings of the respective image forming units.

Figure 16:
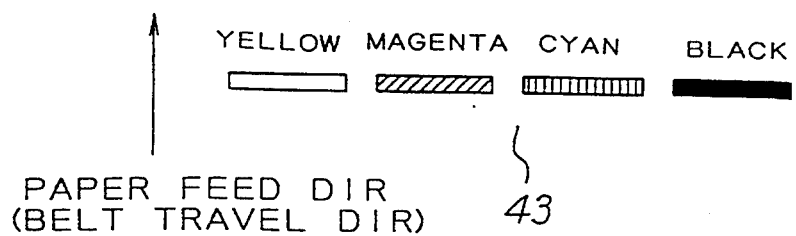
FIG. 16 is a model view for showing a timing mark for detcting the mal-register rate.
Figure 17:
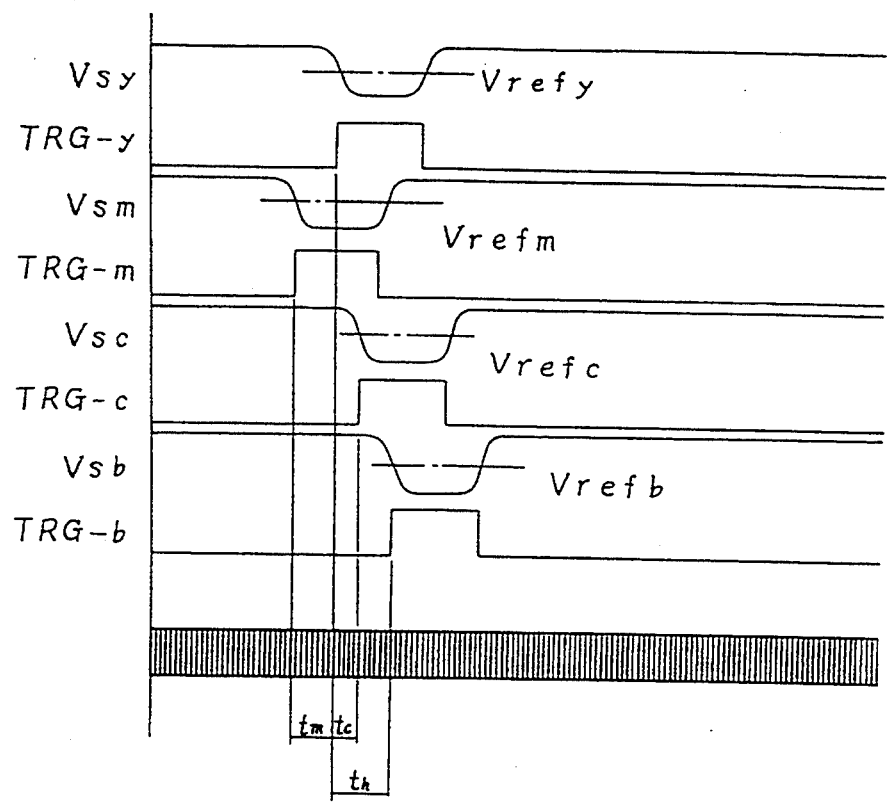
FIG. 17 is a timing chart for assistance in explaining a method of detecting the timing mark detection signal and the mal-register rate.
Figure 18:
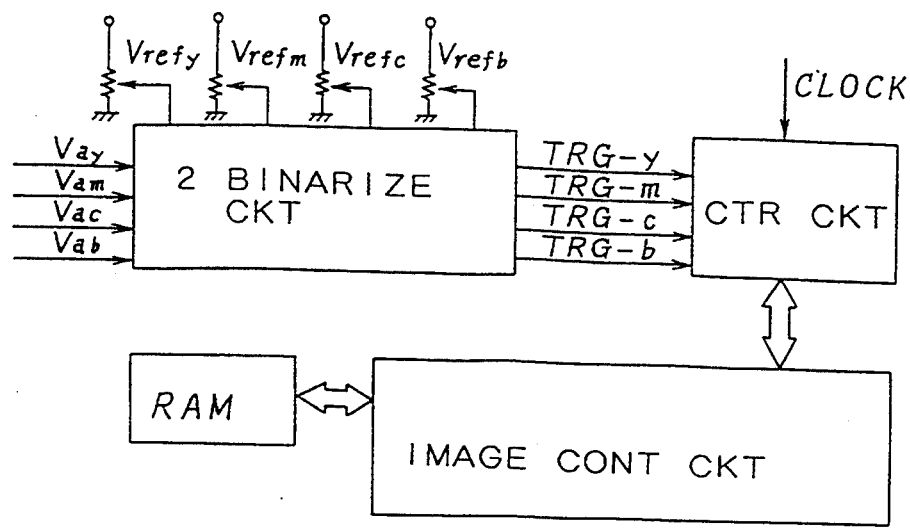
FIG. 18 is a circuit block diagram showing means for detecting the timing mark and means for calculating the mal-register rate.
Figure 19:
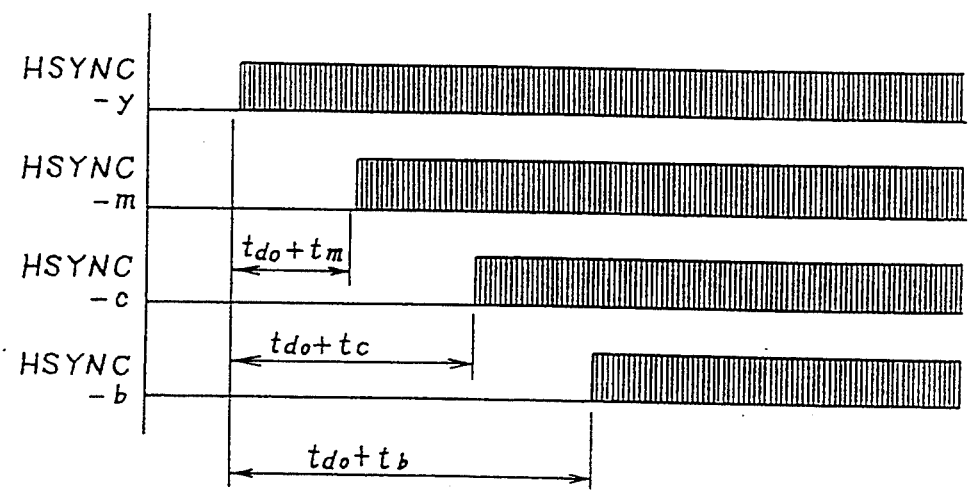
FIG. 19 is a timing chart for assistance in explaining a method of correcting the imge write timing.
Figure 20:
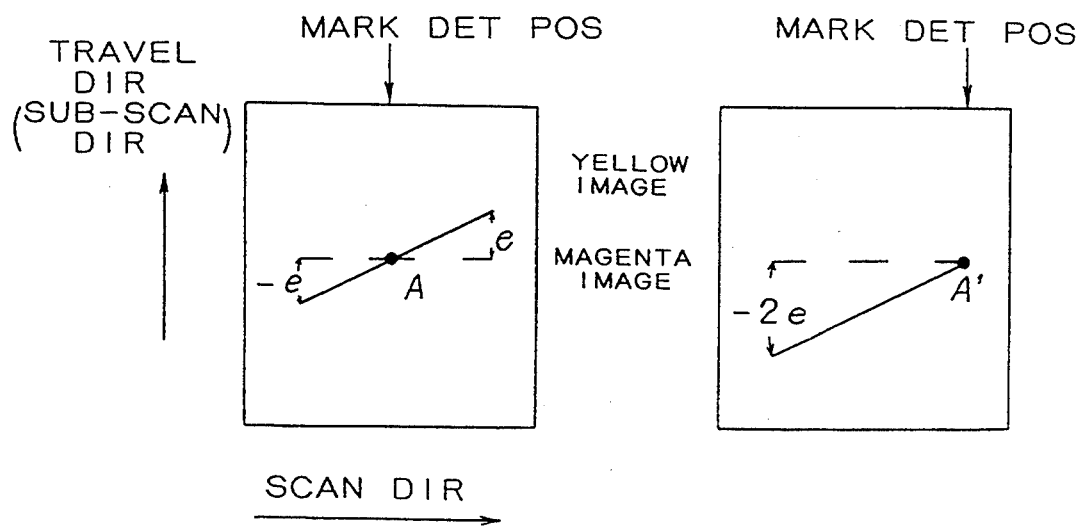
FIGS. 20(a) and 20(b) are model views for assistance in explaining the optimum detection positions.

In FIGS. 15(a) and 15(b) a rod-shaped light source 42 is disposed inside the transcribing belt 10. Further, a slit plate 41 formed with four slits and four light receiving elements 6p1, 7p1, 8p1 and 9p1 are arranged on the side of the transcribing belt 10 remote from the light source 42 (so as to place the belt 10 between light source 42 and plate 41 and the light receiving elements). Before the paper 22 is fed and printed, a pattern mark 43 as shown in FIG. 16 is recorded on the transcribing belt 10 by the respective image forming units 6, 7, 8 and 9. Therefore, when the recorded pattern mark 43 is passed through mark detecting means 45, since the light emitted by the light source is shaded, output signals (Vsy, Vsm, Vsc and Vsb) of the four light receiving elements change as shown in FIG. 17. These output signals are converted into binary signals TRG-y, TRG-m, TRG-c and TRG-b by a binarizing circuit (shown in FIG. 18) on the basis of thresholds Vrefy, Vrefm, Vrefc and Vrefb. Here, the thresholds Vref are determined to be different from each other in such a way that these threshold values become the respective intermediate values between the maximum and minimum outputs of the respective light receiving elements. The offset times of the rise edges of the respective detection signals TRG are detected by a counter circuit by counting a clock pulse, and the counted data are transferred to the image control circuit to calculate the respective mal-register rates of the respective color images. Further, the image control circuit stores once these mal-register rates in a memory (RAM), and corrects the image write timings of the respective image forming units on the basis of the stored mal-register rate data in the printing process. FIG. 19 is a timing chart showing the above-mentioned respective color image mal-register rates. In FIG. 19, tdo denotes differences in the write timing determined in the basis of the ideal paper feeding speed and the distances between the respective image forming units, and tm (magenta), tc (cyan) and tb (black) are correction times obtained on the basis of the respective measured color image mal-register rate data, in which the yellow image is taken as a basis.

Owing to the above-mentioned technique, it is possible to eliminate the color image mal-register rates when the mounting error of the image forming units, the mounting error of the LED head, the speed error of the transcribing belt, etc. are so large as to be not negligible. Further, in this embodiment, it is preferable to detect the timing mark pattern at the middle of the image in the main scanning direction. This is because when the printed image angles are different from each other due to inclinations of the LED heads and the photosensitive drum and further when the timing mark pattern is detected at the image middle portion A as shown by (a) in FIG. 20, since the write timing differences of the LED heads are controlled so that the offset can be reduced to zero in this embodiment, the image mal-register due to the inclination is e at the maximum. On the other hand, when the timing mark pattern is detected at the end of the image, since the point A' is reduced to zero, the image mal-register due to the inclination is 2e at the maximum, so that the offset is increased. On the basis of the above-mentioned reason, it is appropriate to detect the timing pattern at the middle portion of the image.

A fifth embodiment will be described hereinbelow. This embodiment can solve the following problems. As already explained, the image mal-register due to the fluctuations of the angular velocity of the photosensitive drum is generated at the exposure point at which an image is written on the photosensitive drum by the LED head and the transfer point at which the image formed on the photosensitive drum is transcribed to a paper.

That is, in order to correct the image mal-register produced when the toner image formed on the photosensitive drum is transcribed onto a paper, it is necessary to measure the rotative fluctuations of the drum before transcription. Further, the image mal-register at the transfer point is predicted on the basis of the measured data, and the drive timing of the print bar is controlled in real time by use of the image mal-register rate as the correction data. Accordingly, in order to predict all the image mal-register rates at the transfer points, it is necessary to obtain the measured data in the overall range of repetitive period of the rotative fluctuations of the respective drum.

The rotative fluctuations of the photosensitive drum are caused mainly by the rotation driving mechanism for driving the drum. In the rotation driving mechanism, in general, a rotative power of a motor for instance is transmitted through a multi-stage speed reduction mechanism composed of a plurality of rotation driving elements. Therefore, the rotative fluctuations of the drum is generated by a plurality of causes, for instance such as vibrations generated between a plurality of the rotation driving elements. Consequently, when the rotative fluctuations of the photosensitive drum are composed of a plurality of random-distributing frequency components, it is necessary to obtain the period corresponding to the least common multiple of all the periods of the respective fluctuation frequency components, and to measure the fluctuation during the period of this obtained least common multiple. Further, in a plurality of the rotation driving mechanisms for constituting the above-mentioned rotation driving mechanism, in the case of the timing pulleys or the timing gears for instance, the reduction ratio has been so far determined not to be an integer ratio, because when the reduction ratio is determined to be an integer ratio, only specific positions of the rotation driving elements are worn away.

However, the fact that the fluctuations must be measured all over the period of the least common multiple of the periods of the random-distributing frequency components of the drum rotative fluctuations implies that it is insufficient to measure only one revolution period of the drum, so that it takes a long time to obtain the measured data. That is, since the fluctuations must be measured for a long time according to the drum fluctuation frequency, there exist problems in that the apparatus cannot be used for a long time or a large memory is required to record the measurement data.

In the fifth embodiment, therefore, the rotative fluctuation frequencies of the elements for causing the major rotative fluctuations of the drum is determined to 1/integer times of one period of the drum.

Figure 21:
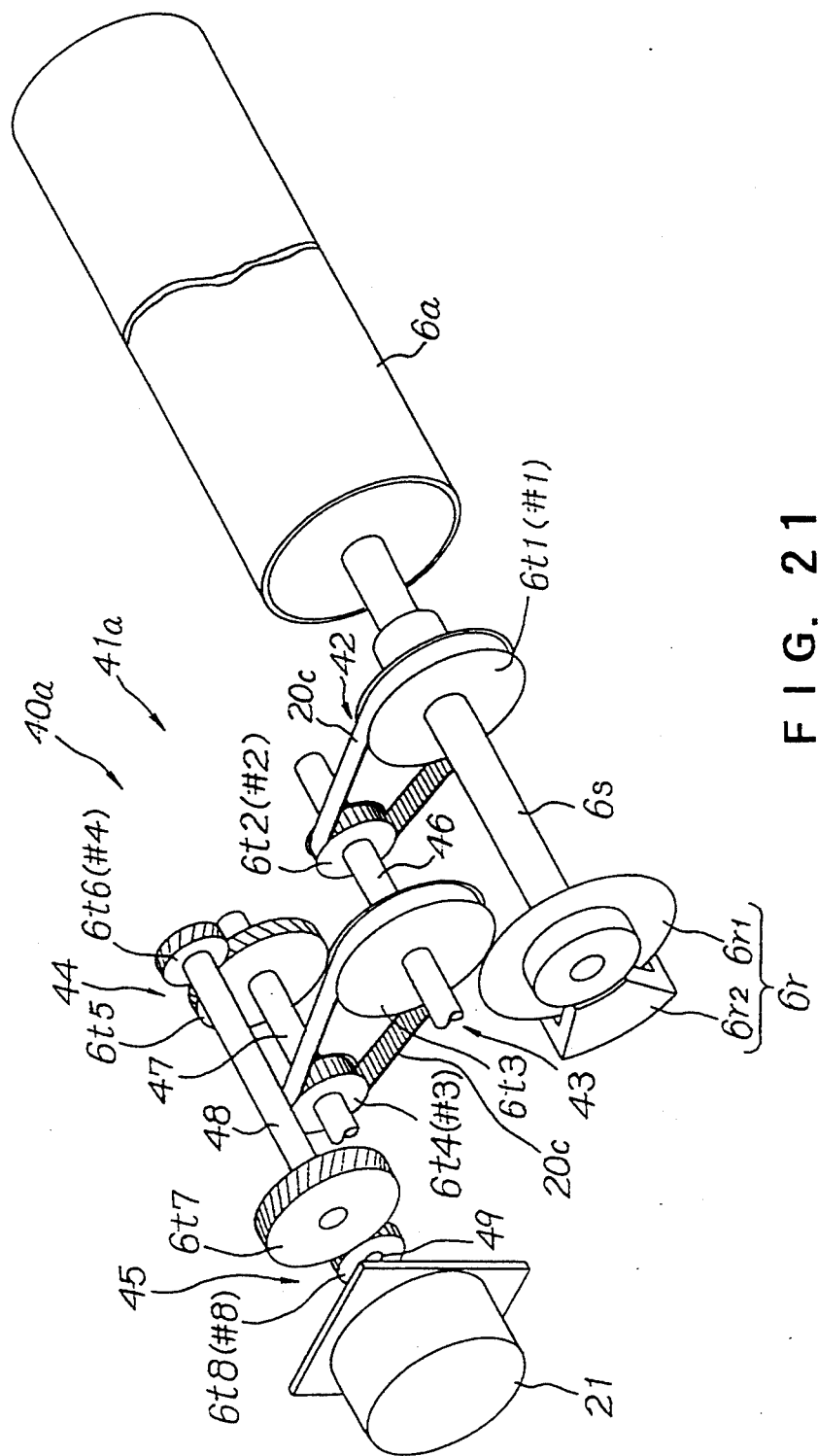
FIG. 21 is a perspective view showing a rotary drive mechanism of the photosensitive drum, for assistance in explaining a fifth embodiment according to the present invention.

In more detail, with reference to FIG. 21, the photosensitive drum 6a is driven by a rotation driving mechanism 40a composed of a motor 21 and a drive power transmitting mechanism 41a. The drive power transmitting mechanism 41a is composed of a pair of timing belt reduction mechanisms 42 and 43 and two pairs of gear reduction mechanisms 44 and 45. The timing belt reduction mechanism 42 includes a timing pulley 6t1 fixed to the photosensitive drum drive shaft 6s, a timing pulley 6t2 fixed to an axle 46, and a timing belt 20c provided between the two timing pulleys 6t1 and 6t2. In the same way, the timing belt reduction mechanism 43 includes a timing pulley 6t3 fixed to the axle 46, a timing pulley 6t4 fixed to an axle 47, and another timing belt 20c provided between the two timing pulleys 6t3 and 6t4. Further, the gear reduction mechanism 44 includes a timing gear 6t5 fixed to the axle 47 and a timing gear 6t6 fixed to an axle 48. In the same way, the gear reduction mechanism 45 includes a timing gear 6t7 fixed to the axle 48 and a timing gear 6t8 fixed to an axle 49.

TABLE 1

| PULLEY GEAR | No. OF TEETH | REDUCT RATIO | REV No. RATIO TO DRUM |
| --- | --- | --- | --- |
| 6t1 | 52 | 2 | 1 |
| 6t2 | 26 |   | 2 |
| 6t3 | 52 | 2 | 2 |
| 6t4 | 26 |   | 4 |
| 6t5 | 96 | 4 | 4 |
| 6t6 | 24 |   | 16 |
| 6t7 | 96 | 4 | 16 |
| 6t8 | 24 |   | 64 |

Table 1 lists the reduction ratios of the timing pulleys and the timing gears (the gear ratios).

The rotative fluctuations of the respective rotation driving elements are caused by the mal-concentricity of the pitch circle diameter and the eccentricity between the axle and the element, and the period of the fluctuations corresponds to the number of revolutions of the driving element. However, it is possible to reduce the rotative fluctuation periods of the respective rotation driving elements down to 1/integer times of the rotative period of the photosensitive drum.

Figure 22:
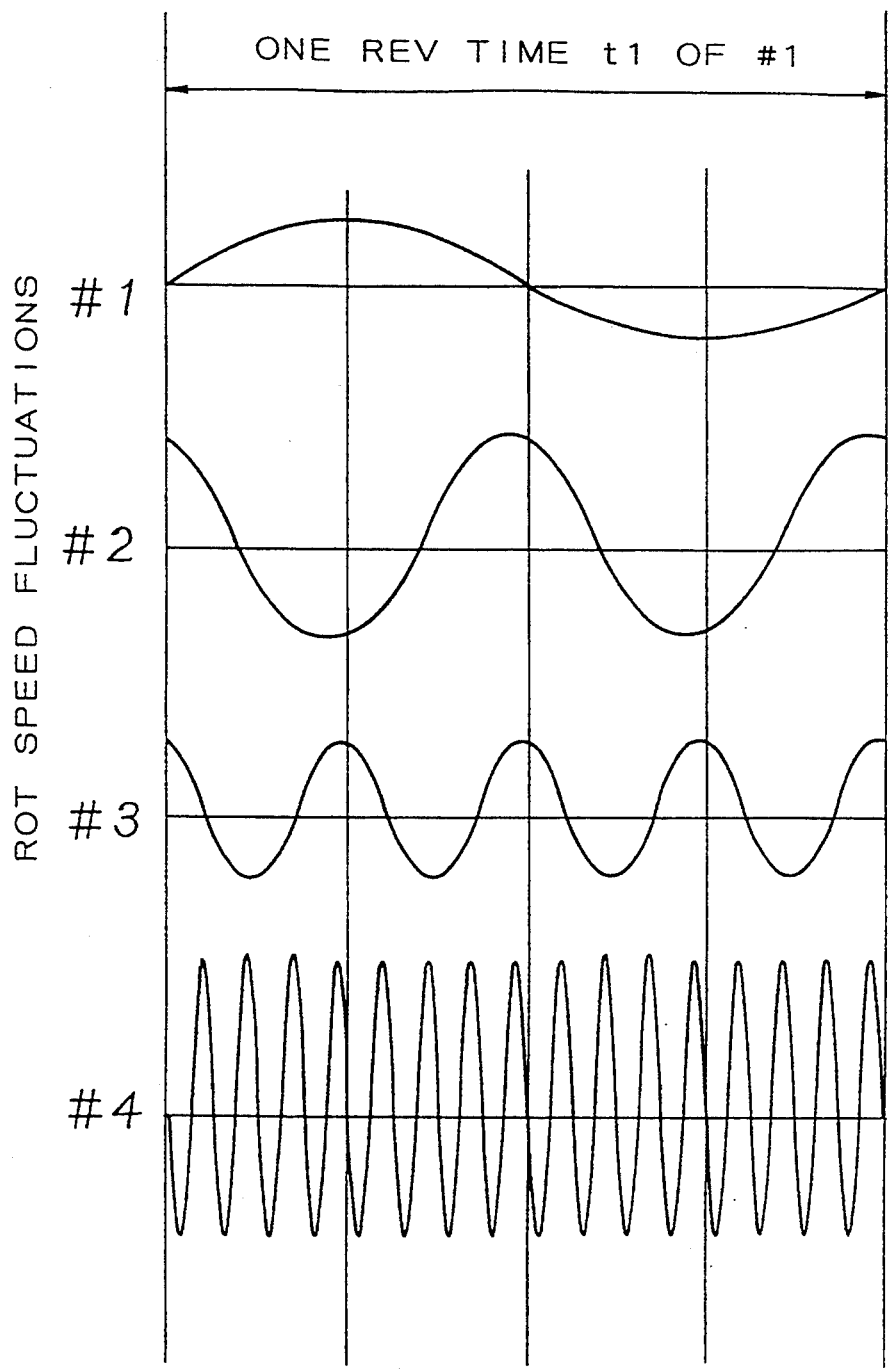
FIG. 22 is an illustration for assistance in explaining the rotative fluctuations of the respective rotary driving elements for constituting the rotary drive mechanism shown in FIG. 21.

FIG. 22 shows the rotative speed fluctuations of the timing pulley 6t1 represented by #1, of the timing pulley 6t2 represented by #2, of the timing gear 6t4 represented by #3, and of the timing gear 6t6 represented by #4, respectively. However, the fluctuations of the timing gear 6t8 represented by #5 is not shown for brevity.

FIG. 22 indicates that since the rotative fluctuations of the respective rotation driving elements are so constructed as to be reduced to 1/integer times of the rotative period of the photosensitive drum, the rotative fluctuations of the respective rotation driving elements are repeated by integer times during one revolution time of the photosensitive drum.

In practice, the rotational fluctuations of the drum are formed in the form of superposition of the rotative fluctuations of the respective driving elements. Therefore, the least common multiple of the periods of the rotative fluctuations of the respective rotation driving elements corresponds one revolution time of the drum. In other words, the sufficient data required to correct the image mal-register are the data obtained by measuring the rotative fluctuations during only one revolution of the drum. That is, as described above, since the rotative fluctuation periods of the respective driving elements are so constructed as to become 1/integer times of the rotation period of the drum, it is possible to shorten the necessary measurement time and further to save the memory capacity for recording the measured fluctuation data.

As described above, in the fifth embodiment, since the one revolution periods of a plurality of the rotation driving elements which constitute the rotation driving mechanism are determined so as to become 1/integer times of the one revolution period of the image recording medium, the periods of the rotative fluctuations of the respective rotation driving elements are 1/integer times of the rotative fluctuations (in which the fluctuations of the respective elements are superposed) of the image recording medium. Therefore, the rotative fluctuations measured only in one period of the image recording medium are sufficient as the measurement data required to predict the image mal-register at the transcription time. As a result, the data measurement time can be shortened and thereby the memory capacity can be reduced, thus improving the productivity of the color image forming apparatus.

A sixth embodiment will be described hereinbelow. The feature of this embodiment is to adopt light beam scanning and recording means including a laser source as the image recording means, instead of the print bar. In the light beam scanning and recording means, a polygonal mirror is rotated to scan a light beam in a direction roughly perpendicular to the rotative direction of the image recording medium; and an image is recorded on the image recording medium by turning on and off the light beam.

Figure 23:
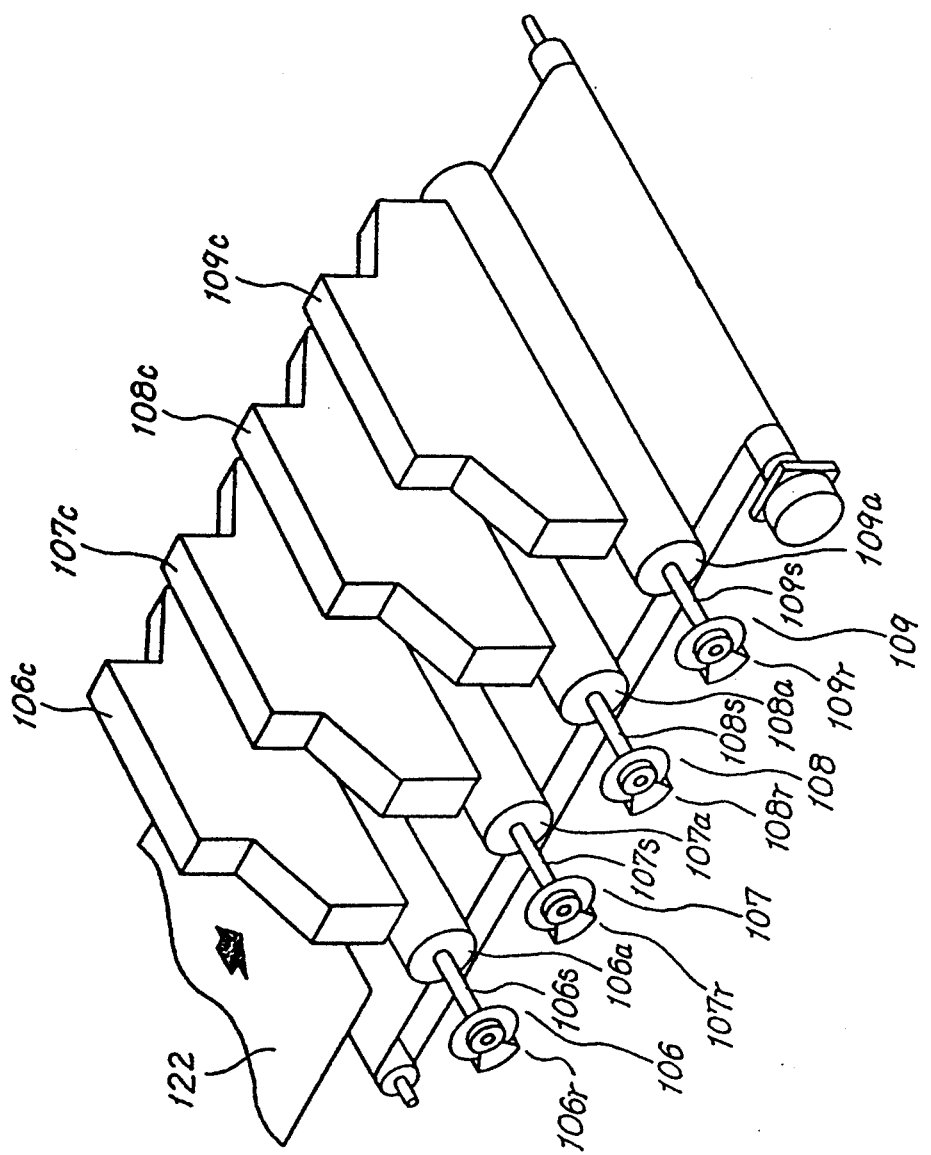
FIG. 23 is a diagrammatical perspective view showing a sixth embodiment of the color image forming apparatus according to the present invention.
Figure 24:
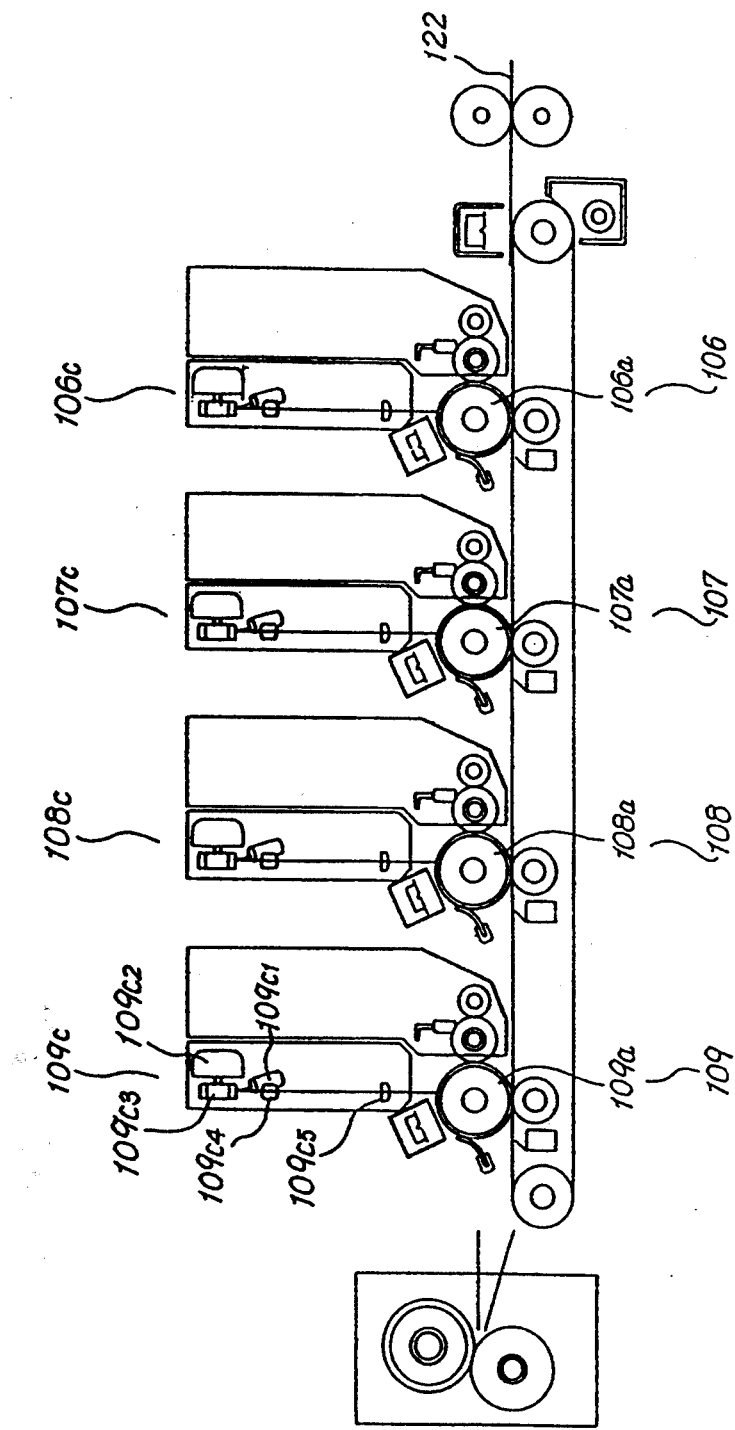
FIG. 24 is a diagrammatical side view showing an electrophotographic tandem color printer.

FIG. 23 is a perspective view showing a tandem color image forming apparatus according to the present invention, and FIG. 24 is a plane view showing the same apparatus, in which optical beam scanning and recording means is used as the image recording means.

In FIGS. 23 and 24, a plurality of monochromatic image forming units 106, 107, 108 and 109 are arranged in the paper feed direction. In this embodiment, rotary encoders 106r, 107r, 108r and 109r are attached to the photosensitive drum shafts 106s, 107s, 108s and 109s of the respective image forming units. Further, timing pulleys (not shown) are mounted to the shafts, respectively, and the photosensitive drums 106a, 107a, 108a and 109a are driven by a motor (not shown) via these timing belts, respectively.

In the image formation of the respective image forming units, the respective surface of the photosensitive drum is charged uniformly with the use of a charging unit (not shown), and then the charged surface (which corresponds to an image area) is selectively exposed to a laser beam. The laser beam is emitted from a semiconductor laser source incorporated in each of the optical units 106c, 107c, 108c and 109c, respectively and turned on and off according to the image information to form an electrostatic latent image, respectively.

Figure 25:
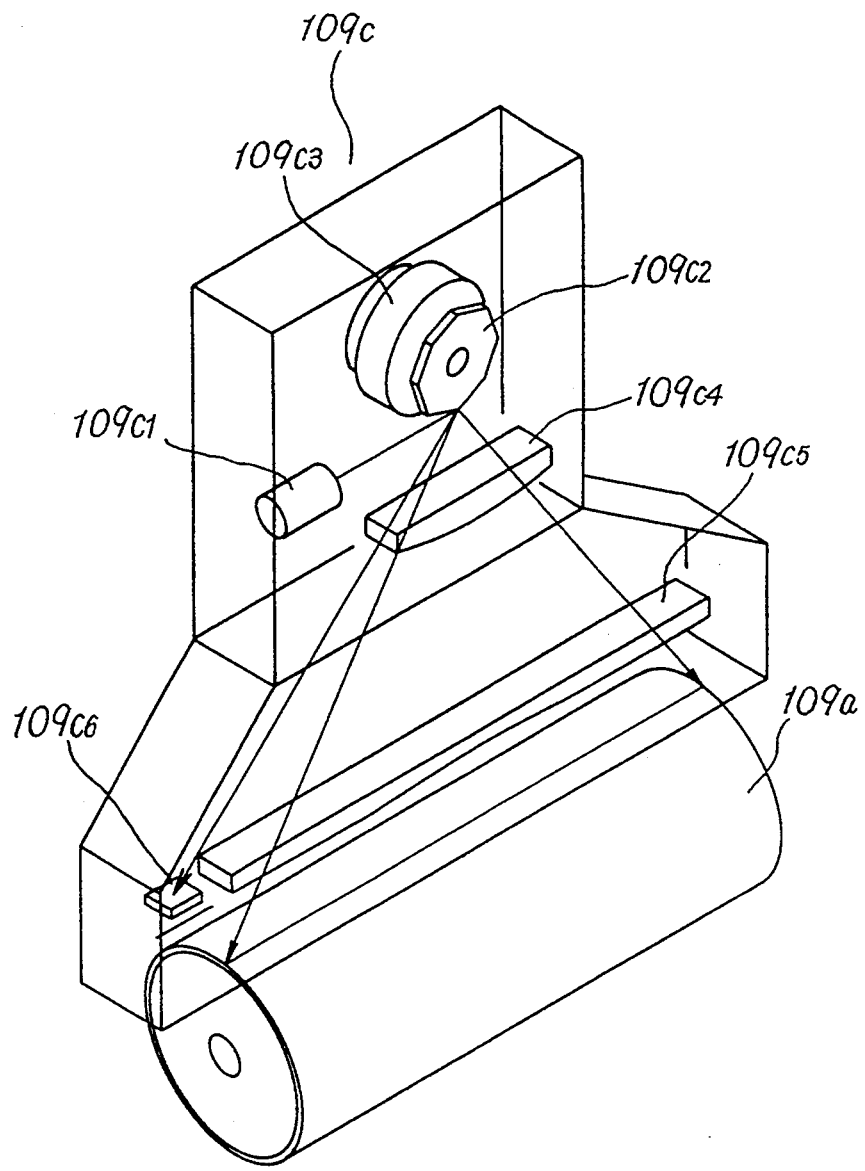
FIG. 25 is a diagrammatical perspective view showing laser scanning means.

FIG. 25 shows the optical unit 109c. The optical unit 109c is composed of a polygonal mirror 109c2 formed with multiple mirror surfaces, a polygon motor 109c3 for rotating the polygonal mirror 109c2, a semiconductor laser unit 109c1, lenses 109c4 and 109c5, and a light receiving element 109c6 for generating an image horizontal synchronizing signal. The semiconductor laser of the laser unit is turned on and off in response to the signal representative of image information. The emitted laser is reflected by the polygonal mirror 109c2 rotating at a high speed so as to scan the surface of the photosensitive drum 109a, so that the surface of the drum 109a can be exposed and thereby an electrostatic latent image can be formed. Further, the other optical units 106c, 107c and 108c are quite the same as above.

With reference to FIG. 23, the image forming process is explained hereinbelow. After the electrostatic latent image is developed to a toner image with a developing unit (not shown), and the developed toner image is transcribed onto a paper 122 with a transcribing unit (not shown). As described above, since an image is once formed on the surface of the photosensitive drum and thereafter the formed image is transcribed onto a paper, conventionally, when the rotative speed of the photosensitive drum fluctuates, the formed image is subjected to be disordered. Therefore, when monochromatic images formed by the respective image forming units are superposed, the mal-register, line offset and banding are produced in the formed color image and thereby the color image is deteriorated in quality.

As the photosensitive drum driving mechanism of this embodiment, a DC brushless motor of PLL (phase locked loop) control and timing belt transmission mechanisms are used. The reasons why these driving mechanisms are adopted are: 1) these mechanisms are small in size so that the apparatus can be reduced in total size; and 2) the number of parts is relatively small and thereby the cost thereof is relatively low.

In the case of the timing belt transmission mechanisms, however, there exists a problem in that it is rather difficult to drive the photosensitive drum at a constant speed accurately, because of an eccentricity of the timing pulley with respect to the shaft, a mal-concentricity of the pitch circle diameter, an accumulated pitch error of the gears, fluctuations due to mesh between the pulley grooves and the belt gears, etc. The above-mentioned pulley eccentricity, the diameter mal-concentricity and the accumulated gear error cause long-period speed fluctuations and thereby result in the mal-register in the color image when the color images are superposed upon each other. The mesh fluctuations cause short-period fluctuations and thereby result in a banding.

Figure 26:
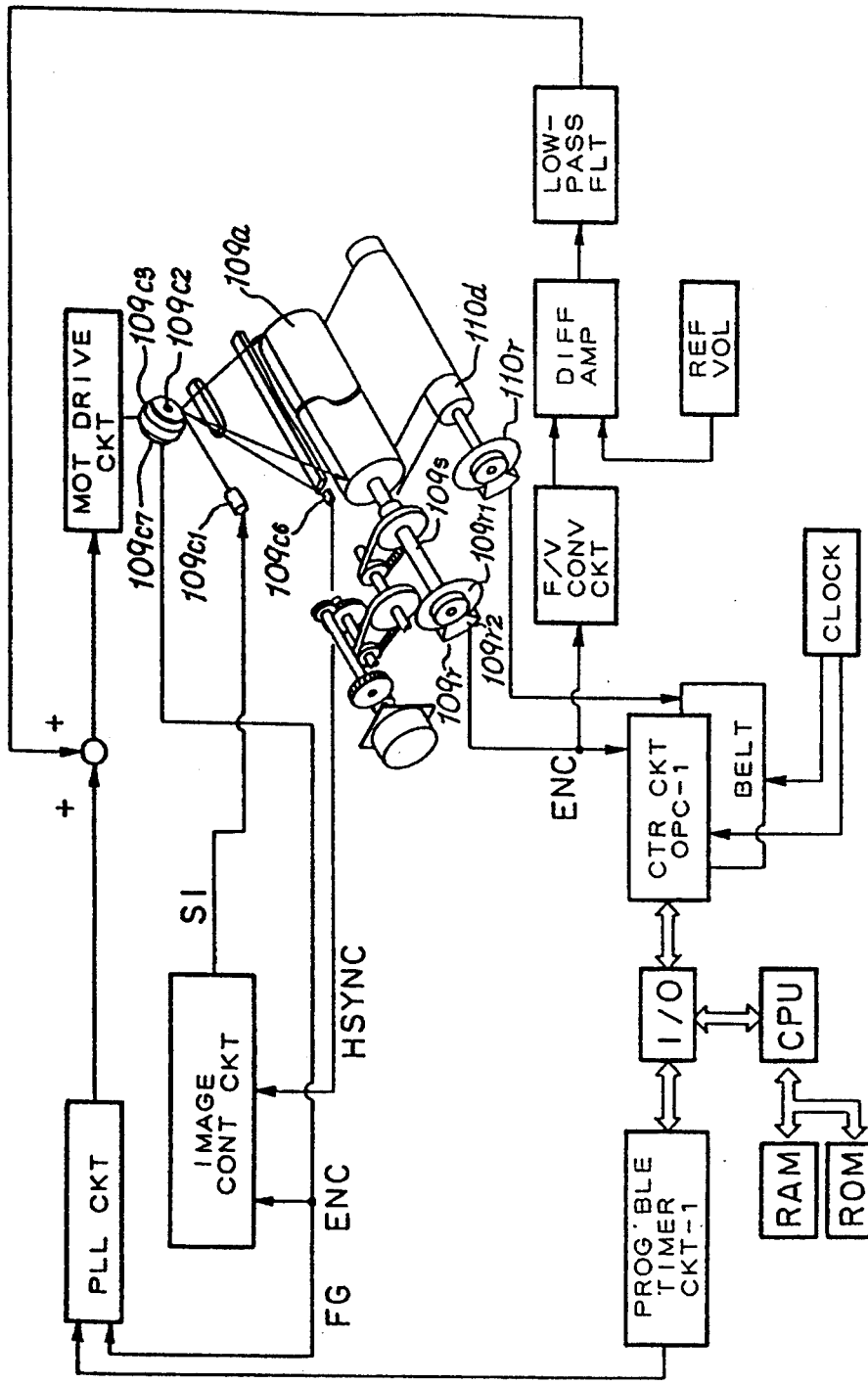
FIG. 26 is a diagrammatical perspective view and a circuit block diagram showing the sixth embodiment of the image forming unit according to the present invention.
Figure 27:
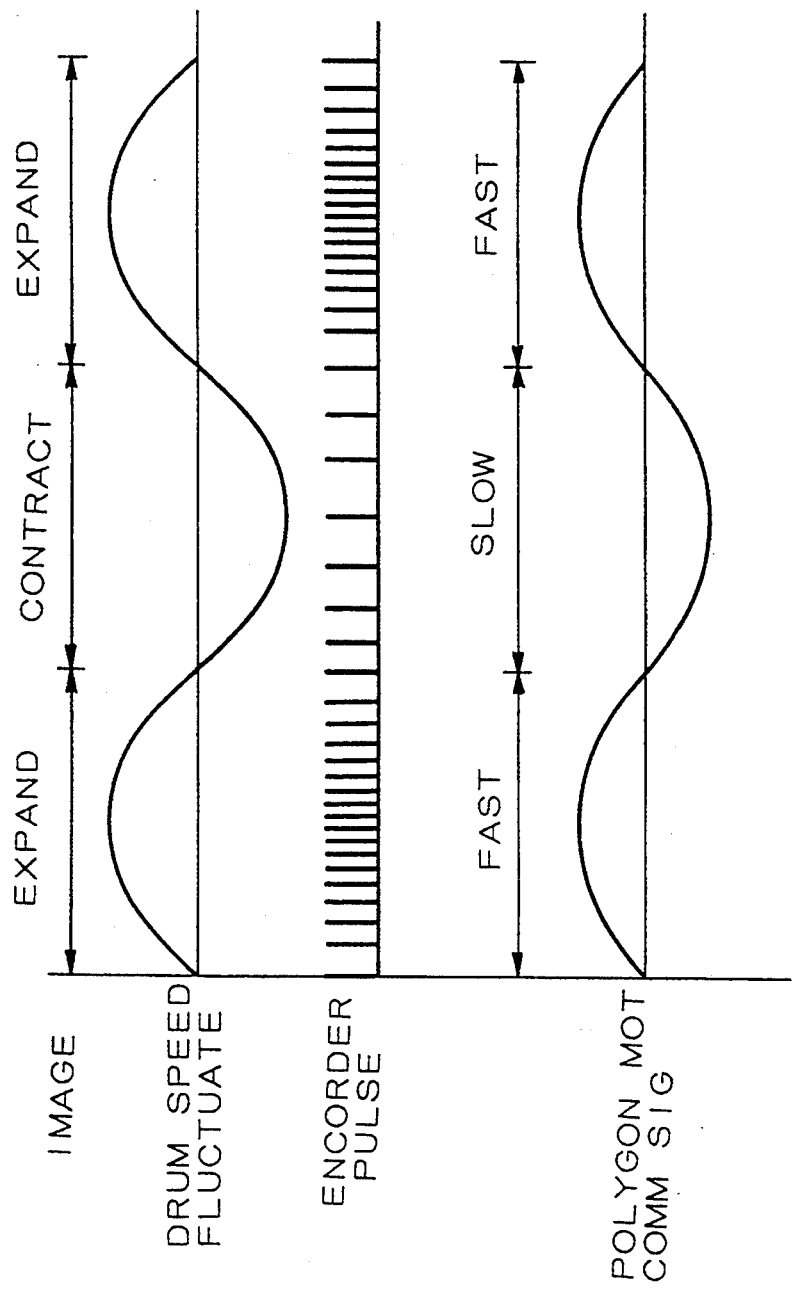
FIG. 27 is an illustration for assistance in explaining the relationship between speed fluctuations of the photosensitive drum and the encoder pulse, the polygonal motor command signal.

To improve the above-mentioned image deterioration due to the rotative speed fluctuations of the photosensitive drum; that is, to obtain a high-quality image, the present embodiment is constructed as follows:

For brevity, FIG. 26 shows only a black image forming unit of the four image forming units and the control circuit thereof, and FIG. 27 shows the timing chart thereof.

An image control circuit 109c controls the input and output of the image information data, and outputs dot data for one page on the basis of the image information data supplied by a computer 5b. Further, the image control circuit 109c transfers a laser drive signal (SI) generated in synchronism with the image dot data for one laser scanning line to a semiconductor laser unit 109c1. In synchronism with this signal, the semiconductor laser unit 109c1 is turned on or off to emit a laser beam. The emitted laser beam is reflected by the polygonal mirror 109c2 to scan the photosensitive drum 109a. A laser beam receiving element 109c6 generates a timing signal (HSYNC: horizontal synchronizing signal) for transmitting data for one laser beam scanning line. The laser drive signal (SI) is in synchronism with this timing signal (HSYNC).

The rotary encoder 109r (rotation detecting means) mounted on the photosensitive drum shaft 109s is composed of a code wheel 109r1 formed with slits extending in the radial direction and arranged in the circumferential direction, and a detecting section 109r2 having a light source and a light receiving element both disposed so as to be opposed to each other. The detecting section 109r2 is an encoder module of YHP (YOKOKAWA) Corp., for instance. Here, although the smaller slit pitch is preferable in the code wheel, the slit pitch is determined so as to become the same resolution as that of the printer under due consideration of cost thereof. In practice, since the diameter of the photosensitive drum is $\Phi = 30$ mm and the printer resolution is 300 dpi (300 dots per inch), 1113 slits are arranged in the circumferential direction of the code wheel 109r1.

The signals of the detecting section 109r2 are converted from digital signals to analog signals by an F/V converting circuit, and compared with a reference signal to output a speed difference signal. The outputted speed difference signal is applied to a low-pass filter circuit to eliminate the higher harmonic components thereof, and then superposed upon a command signal applied from a PLL (phase locked loop) circuit to a motor drive circuit for driving a polygon motor 109c3.

The above-mentioned driving effect will be described hereinbelow with reference to FIG. 27. As shown in FIG. 27, when the rotative speed of the photosensitive drum 109a fluctuates and further when the laser beam is scanned at a constant frequency, the image is expanded at the high speed range but contracted at the low speed region. Under these conditions, the frequency of the encoder pulse signal increases with increasing drum speed and decreases with decreasing drum speed. Therefore, as already explained, when the speed difference signal is formed on the basis of the encoder pulse signal and then fed back as the command signal to the polygon motor drive circuit, the polygon motor speed fluctuates in synchronism with the speed fluctuations of the photosensitive drum. Accordingly, since the generated data transferring timing (HSYNC) fluctuates, when the laser beam is scanned in synchronism with this timing, the image expansion and contraction are canceled or reduced.

In practice, since the polygon motor 109c3 is driven stably at such a high speed of 5000 to 10,000 rpm, it is difficult to change the rotative speed thereof perfectly in synchronism with the rotative fluctuations of the photosensitive drum. In particular, it is difficult to change the polygon motor speed in synchronism with a short-period fluctuations of several tens Hz or higher.

Therefore, in this embodiment, only the frequency components of several times higher than the rotation period of the drum are extracted from the frequency components of the rotative fluctuations of the drum through the low-pass filter, and then the extracted frequency components are fed back as the command signal to the polygon motor. Here, since the mal-register is caused mainly by the eccentricity and the accumulated pitch error of the gears and pulleys included in the drum driving mechanism, no problem arises even if the rotative fluctuations of the drum are limited to only the low-frequency components. Therefore, even if the photosensitive drum speed fluctuates, it is possible to form an image at a constant pitch in proportion to the encoder pitch, so that the mal-register of the image due to the long-period fluctuations of the drum can be suppressed.

In the above-mentioned correcting method, the mal-register is corrected in the rotative direction of the photosensitive drum or the paper feed direction (sub-scanning direction). In this method, however, since the rotative speed of the polygon motor fluctuates, the laser beam scanning speed also fluctuates. In other words, when the image is formed in synchronism with the clock of a constant frequency, the image length changes in the laser beam scanning direction (the main scanning direction). To overcome this problem, in this embodiment, the following method is adopted.

Figure 28:
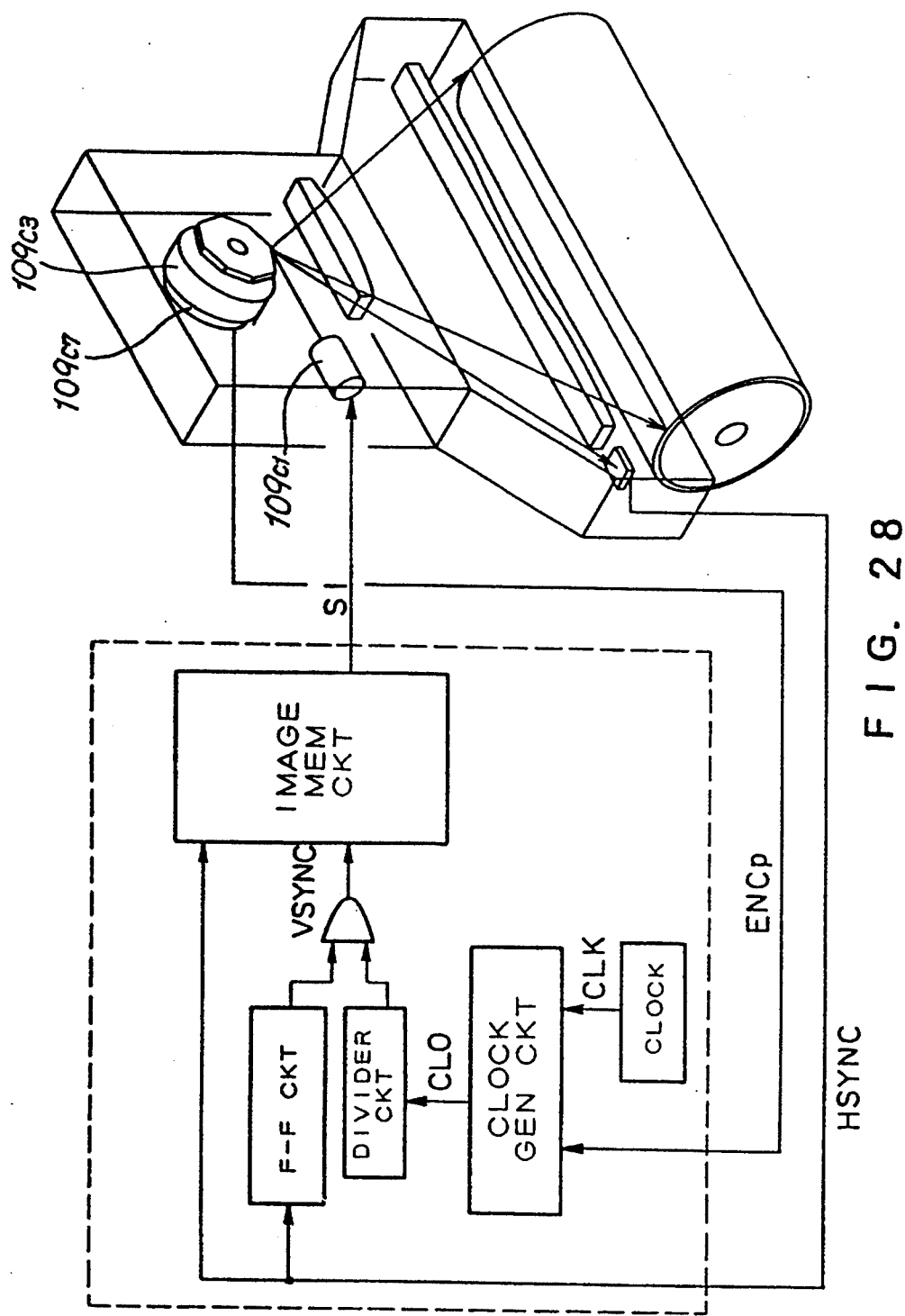
FIG. 28 is a diagrammatical perspective view and a control block diagram of laser scanning means for the sixth embodiment of the present invention.
Figure 29:
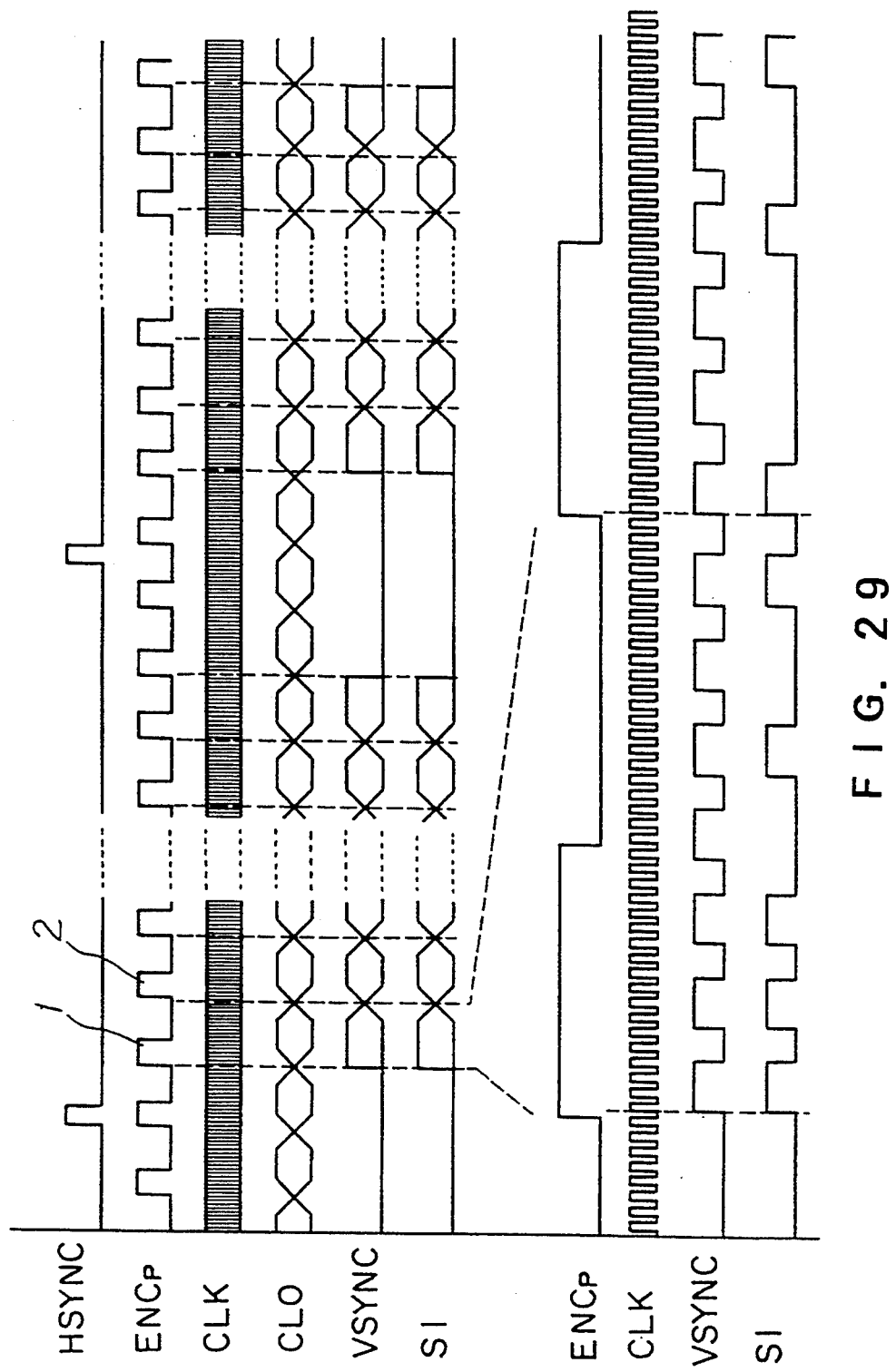
FIG. 29 is a timing chart for assistance in explaining the laser control in synchronism with the laser scanning means.

With reference to FIGS. 28 and 29, the polygon motor 109c3 is provided with a rotary encoder 109c7 as a rotation detector required to drive the polygon motor 109c3 in accordance with the PLL method. In this embodiment, the semiconductor laser 109c1 is driven in synchronism with the encoder output signal. As shown in FIG. 28, an output pulse ECNp of the polygon encoder is inputted to a clock generator. This clock generator outputs a signal (CLO) in synchronism with a rise edge of the signal ENCp. This signal (CLO) is divided into a frequency for turning on and off the laser beam in the laser beam scanning direction, and inputted to an image memory circuit as a vertical synchronizing signal (VCKL) in synchronism with the horizontal synchronizing signal (HSYNC). On the basis of this signal (VCLK), the image memory circuit reads the image dot data for one laser beam line from the image memory circuit, and outputs the read data to a semiconductor laser unit as a laser drive signal SI. Therefore, even if the rotative speed of the polygon motor is changed according to the speed fluctuations of the photosensitive drum, since the encoder output also changes according to the revolution speed of the polygon motor and further the laser beam is emitted on the basis of the clock signal CLK in synchronism with this encoder output, it is possible to prevent the image length from being fluctuated in the laser beam scanning direction.

Here, the technique for effectively reducing the image mal-register produced due to the speed fluctuations of the photosensitive drum at the transfer position will be described in relation to this embodiment.

Before the image is formed by the laser beam scanning, the rotational speed fluctuations of the photosensitive drum are detected by an encoder to calculate the mal-register rate data at the transfer position. On the basis of the calculated data, the frequency of the reference clock signal for driving the polygon motor in accordance with PLL method is controlled to form the image in such a way that the mal-register produced when the image on the drum is transcribed onto the paper can be canceled.

The technique for reducing the mal-register at the transfer point in this embodiment is as follows: With reference to FIG. 26, the image mal-register to be produced when the image formed on the surface of the photosensitive drum 109a due to exposure of the laser beam is transcribed on the paper at the transfer point is first predicted. According to the predicted rate, the frequency of the reference clock signal applied to the PLL drive circuit for driving the polygon motor is controlled. Since the polygon motor speed is changed according to the reference signal, the latent image formed on the surface of the photosensitive drum is shifted in the drum rotative direction. In other words, this method is to correct the mal-register at the exposure point previously in anticipation of the mal-register at the transfer point. In order to predict the mal-register at the transfer point, before the laser beam is scanned, the speed fluctuations of the drum for one revolution are measured and further recorded in memory.

For the above-mentioned prediction, a CPU collects the speed fluctuation data of the photosensitive drum and controls the frequency fluctuations of the reference clock applied to the polygon motor PLL drive circuit. The speed fluctuations of the drum are measured by counting the pulse intervals of the encoder pulses, and the data indicative of the relationship between the encoder angular position and the speed fluctuations are stored in a RAM temporarily.

When the laser beam is emitted, the CPU reads the fluctuation data stored in the RAM on the basis of the current encoder angular position, and transmits data to a programmable timer circuit in sequence. On the basis of the data, the programmable timer circuit outputs the reference signals of different frequencies to a PLL circuit. Since the polygon motor is driven in accordance with the frequencies of the reference signals, the image length to be formed can be controlled, so that it is possible to correct the mal-register anticipated at the transfer point at the exposure point.

Here, the method of controlling the frequency of the reference clock signal applied to the polygon motor by predicting the mal-register at the transfer point on the basis of the recorded fluctuation time data for one revolution of the drum will be described hereinbelow with reference to FIGS. 30 and 31.

In FIG. 30, the programmable timer circuit can generate pulse signals of any desired frequencies on the basis of data determined by the CPU. Therefore, the frequency of the reference clock signal REF PLS applied to the polygon motor PLL drive circuit is changed by the programmable timer circuit.

In more detail, the data is sent to the programmable timer circuit on the basis of the interrupt processing of the encoder signal of the photosensitive drum. The interrupt routine is shown in FIG. 31. In the flowchart as shown in FIG. 31, when the interrupt starts, control (CPU) first disables another inhibition, and counts the ENC signals to read the current encoder position. On the basis of the obtained current encoder position, a control reads the drum speed fluctuation data from the RAM, calculates the predicted mal-register rate at the transfer point, and sets the frequency determining data to the programmable timer circuit. Therefore, the frequency of the reference signal applied to the polygon motor changes on the basis of the encoder signal ENC. Since the rotative speed of the polygon motor changes according to the frequency of the reference clock frequency, it is possible to correct the image mal-register anticipated at the transfer point at the exposure point.

In the above description, although only one image forming unit has been taken into account, quite the same method can be applied to the other three image forming units.

The mal-register due to the speed fluctuations of the transcription belt can be corrected in quite the same way as above. As shown in FIG. 26, a rotary encoder 110r is mounted on a transcription belt drive roller 110d, and the rotative speed fluctuations of the transcription belt are detected by a counter circuit (a block represented by "BELT" in FIG. 26). Further, simultaneously, the current angular position of the belt is detected. The CPU reads the fluctuation data of the transcription belt from the RAM in accordance with the detected angular position of the transcription belt drive roller 110d, and sets the determined frequency of the reference clock (applied to the polygon motor PLL drive circuit) to the programmable timer circuit. Therefore, it is possible to correct the mal-register due to feed speed fluctuations of the transcription belt at the exposure time.

In the description of the above embodiment, two methods have been explained: a method of changing the scanning speed of the laser beam scanning means in synchronism with the rotative speed of the image recording medium (the photosensitive drum) and a method of changing the same in synchronism with the feed speed of the image transcribing medium (the paper). Although it is the most effective to control the scanning speed of the laser beam scanning means in synchronism with the signal in which both the speed fluctuations are superposed upon each other, however, it is possible to reduce the mal-register effectively by synchronizing the scanning speed with either one of both. Further, when the scanning speed of the laser scanning and recording means is synchronized with the speed fluctuations of the photosensitive drum, it is possible to obtain the correction effect to some extent even if the mal-register at the transfer point is not predicted. In other words, as far as the mal-register can be reduced below a predetermined value, it may be unnecessary to correct the mal-register at the transfer point.

As described above, in the image forming apparatus according to the present invention, even if the photosensitive drums of the respective monochromatic image forming units fluctuate with respect to the angular velocity, since the scanning speed of the laser beam is controlled according to the angular travel rate of the photosensitive drum, it is possible to eliminate the mal-register in the color image obtained by superposing the respective color images. Further, at the same time, even if the transcription belt for feeding paper fluctuates in the travel speed, since the scanning speed of the laser beam is controlled according to the travel speed fluctuations of the transcription belt, it is possible to eliminate the mal-register in the color image. Further, since the laser beam is turned on and off in synchronism with the laser beam scanning speed, the mal-register is not produced even if the laser beam scanning speed is changed. Accordingly, it is possible to realize a high quality image without increasing the mechanical precision of the respective elements of the apparatus excessively.

In the above-mentioned embodiments, an electrophotographic type image forming apparatus provided with the LED heads or the laser beam scanning means has been described by way of example. Without being limited only thereto, it is possible to obtain the same effect as above, when the present invention is applied to the image forming apparatus provided with linear solid-state scanning heads such as fluorescent light heads, liquid crystal heads including the fluorescent lamps and liquid crystal shutters, EL (electro luminescent) heads, etc.

In addition, without being limited only to the electrophotographic method, the present invention can be apparently applied to the color image forming apparatus of another type, as far as the image forming units are arranged in tandem, for instance such that in each image forming unit, a latent image is formed on the surface of a dielectric drum by use of an ion recording head; the latent image is developed to a toner image; and the toner image is transcribed onto paper, respectively to form a color image. Further, without being limited only to image, the present invention can be of course applied when characters are required to be printed under excellent registration.

What is claimed is:

1. An image forming apparatus for forming an image by recording image information and transcribing the recorded image information on an image transcribing medium, which comprises:
   an image recording medium for recording the image information;
   a rotational driving mechanism for rotating said image recording medium;
   image recording means for recording an image repeatedly on said rotating image recording medium in a direction roughly perpendicular to a rotational direction of said image recording medium;
   rotation detecting means for detecting angular travel rates of said image recording medium; and
   recording timing control means for controlling recording timing at which the image is started to be recorded in the direction perpendicular to the rotational direction of said image recording medium, on the basis of the angular travel rates detected by said rotation detecting means, wherein
   said image recording means includes optical beam scanning and recording means for rotating a rotary polygonal mirror to scan an optical beam in the direction roughly perpendicular to the rotational direction of said image recording medium and for recording an image on said image recording medium by turning on and off the optical beam; and
   said recording timing control means includes scanning speed control means for controlling a scanning speed of the optical beam on the basis of the angular travel rates detected by said rotation detecting means.

2. The image forming apparatus of claim 1, wherein:
   said optical beam scanning and recording means includes polygonal mirror rotation detecting means for detecting angular travel rates of said rotary polygonal mirror; and
   said recording timing control means includes on-off timing control means for controlling the timing at which the optical beam is turned on and off, on the basis of the angular travel rates detected by said polygonal mirror rotation detecting means.

3. An image forming apparatus for forming an image by recording image information and transcribing the recorded image information on an image transcribing medium, which comprises:
   an image recording medium for recording the image information;
   a rotational driving mechanism for driving said image recording medium;
   image recording means for recording an image repeatedly on said rotating image recording medium in a direction perpendicular to a rotational direction of said image recording medium;
   rotation detecting means for detecting angular travel rates of said image recording medium;
   recording timing control means for controlling recording timing at which the image is started to be recorded in the direction perpendicular to the rotational direction of said image recording medium;
   memory means for previously storing fluctuations in angular travel rates of said image recording medium;
   calculating means for calculating predicted mal-register rates at a transfer position at which the image recorded on said image recording medium is transcribed onto the image transcribing medium, on the basis of the fluctuations in the angular travel rates stored in said memory means; and
   correcting means for correcting the recording timing on the basis of the calculated mal-register rates at the transfer position.

4. The image forming apparatus of claim 3, wherein said rotation detecting means is mounted on a drive shaft of said image recording medium to detect angular positions of the drive shaft.

5. The image forming apparatus of claim 3, wherein said rotational driving mechanism comprises a plurality of mutually connected rotational driving elements, a time required to rotate the rotational driving elements by one revolution being determined to be 1/integer times of a time required to rotate the image recording medium by one revolution.

6. The image forming apparatus of claim 3, wherein:
said image recording means includes optical beam scanning and recording means for rotating a rotary polygonal mirror to scan an optical beam in the direction roughly perpendicular to the rotational direction of said image recording medium and for recording an image on said image recording medium by turning on and off the optical beam; and
said recording timing control means includes scanning speed control means for controlling scanning speed of the optical beam on the basis of the angular travel rates detected by said rotation detecting means.

7. The image forming apparatus of claim 6, wherein:
said optical beam scanning and recording means includes polygonal mirror rotation detecting means for detecting angular travel rates of said rotary polygonal mirror; and
said recording timing control means includes on-off timing control means for controlling the timing at which the optical beam is turned on and off, on the basis of the angular travel rates detected by said polygonal mirror rotation detecting means.

8. A color image forming apparatus for forming a color image by recording image information and transcribing the recorded image information on an image transcribing medium, which comprises:
a plurality of image forming units arranged in a feed direction of the image transcribing medium, each of said image forming units including:
an image recording medium for recording the image information;
a rotational driving mechanism for rotating said image recording medium;
image recording means for recording an image repeatedly on said rotating image recording medium in a direction perpendicular to a rotational direction of said image recording medium;
rotation detecting means for detecting angular travel rates of said image recording medium; and
recording timing control means for controlling recording timing at which the image is started to be recorded in the direction perpendicular to the rotational direction of said image recording medium, on the basis of the angular travel rates detected by said rotation detecting means, wherein
each of said image forming units comprises position detecting means for detecting that the image transcribing medium is fed to a predetermined position, the recording timing being controlled on the basis of a position signal detected by said position detecting means and an angular travel rate detected by said rotation detecting means.

9. The color image forming apparatus of claim 8, wherein said position detecting means is provided for each of said image forming units.

10. The color image forming apparatus of claim 8, wherein said position detecting means detects that the image transcribing medium is fed to the predetermined position by detecting that a mark described on a feeding medium for feeding the image transcribing medium is passed through the predetermined position.

11. An image forming apparatus for forming a color image by recording image information and transcribing the recorded image information on an image transcribing medium, which comprises:
a plurality of image forming units arranged in a feed direction of the image transcribing medium, each of said image forming units including:
an image recording medium for recording the image information;
a rotational driving mechanism for rotating said image recording medium;
image recording means for recording an image repeatedly on said rotating image recording medium in a direction roughly perpendicular to a rotational direction of said image recording medium;
rotation detecting means for detecting angular travel rates of said image recording medium; and
recording timing control means for controlling recording timing at which the image is started to be recorded in the direction perpendicular to the rotational direction of said image recording medium, on the basis of the angular travel rates detected by said rotation detecting means, wherein
said image recording means includes optical beam scanning and recording means for rotating a rotary polygonal mirror to scan an optical beam in the direction roughly perpendicular to the rotational direction of said image recording medium and for recording an image on said image recording medium by turning on and off the optical beam; and
said recording timing control means includes scanning speed control means for controlling a scanning speed of the optical beam on the basis of the angular travel rates detected by said rotation detecting means.

12. The image forming apparatus of claim 11, wherein:
said optical beam scanning and recording means includes polygonal mirror rotation detecting means for detecting angular travel rates of said rotary polygonal mirror; and
said recording timing control means includes on-off timing control means for controlling the timing at which the optical beam is turned on and off, on the basis of the angular travel rates detected by said polygonal mirror rotation detecting means.

13. A color image forming apparatus for forming a color image by recording image information and transcribing the recorded image information on an image transcribing medium, which comprises:
a plurality of image forming units arranged in a feed direction of the image transcribing medium, each of said image forming units including:
an image recording medium for recording the image information;
a rotational driving mechanism for driving said image recording medium;
image recording means for recording an image repeatedly on said rotating image recording medium in a direction perpendicular to a rotational direction of said image recording medium; and
rotation detecting means for detecting angular travel rates of said image recording medium; and
recording timing control means for controlling recording timing at which the image is started to be recorded in the direction perpendicular to the rotational direction of said image recording medium;

memory means for previously storing fluctuations in angular travel rates of said image recording medium;

calculating means for calculating predicted mal-register rates at a transfer position at which the image recorded on said image recording medium is transcribed onto the image transcribing medium, on the basis of the fluctuations in the angular travel rates stored in said memory means; and correcting means for correcting the recording timing on the basis of the calculated mal-register rates at the transfer position.

14. The color image forming apparatus of claim 13, wherein said image forming unit comprises position detecting means for detecting that the image transcribing medium is fed to a predetermined position, the recording timing being controlled on the basis of a position signal detected by said position detecting means and an angular travel rate detected by said rotation detecting means.

15. The color image forming apparatus of claim 13, wherein said position detecting means is provided for each of said image forming units.

16. The color image forming apparatus of claim 14, wherein said position detecting means detects that the image transcribing medium is fed to the predetermined position by detecting that a mark described on a feeding medium for feeding the image transcribing medium is passed through the predetermined position.

17. The color image forming apparatus of claim 13, wherein said rotation detecting means is mounted on a drive shaft of said image recording medium to detect angular positions of the drive shaft.

18. The color image forming apparatus of claim 13, wherein said rotational driving mechanism comprises a plurality of mutually connected rotational driving elements, a time required to rotate the rotational driving elements by one revolution being determined to be 1/integer times of a time required to rotate the image recording medium by one revolution.

19. The color image forming apparatus of claim 13, wherein:

said image recording means includes optical beam scanning and recording means for rotating a rotary polygonal mirror to scan an optical beam in the direction roughly perpendicular to the rotational direction of said image recording medium and for recording an image on said image recording medium by turning on and off the optical beam; and said recording timing control means includes scanning speed control means for controlling scanning speed of the optical beam on the basis of the angular travel rates detected by said rotation detecting means.

20. The color image forming apparatus of claim 13, wherein:

said optical beam scanning and recording means includes polygonal mirror rotation detecting means for detecting angular travel rates of said rotary polygonal mirror; and said recording timing control means includes on-off timing control means for controlling the timing at which the optical beam is turned on and off, on the basis of the angular travel rates detected by said polygonal mirror rotation detecting means.

* * * * *